(12) United States Patent
Jurkowitz, Jr.

(10) Patent No.: US 9,967,022 B2
(45) Date of Patent: May 8, 2018

(54) COMBINATION TESTER

(71) Applicant: Nicholson Labs, Inc., Cincinnati, OH (US)

(72) Inventor: Daniel Raymond Jurkowitz, Jr., Cincinnati, OH (US)

(73) Assignee: Nicholson Labs, Inc., Cincinnati, OH (US)

( * ) Notice: Subject to any disclaimer, the term of this patent is extended or adjusted under 35 U.S.C. 154(b) by 630 days.

(21) Appl. No.: 14/458,330

(22) Filed: Aug. 13, 2014

(65) Prior Publication Data

US 2015/0051848 A1 Feb. 19, 2015

Related U.S. Application Data

(60) Provisional application No. 61/865,453, filed on Aug. 13, 2013.

(51) Int. Cl.
*H04B 7/26* (2006.01)
*G01L 19/08* (2006.01)
*G01M 3/28* (2006.01)

(52) U.S. Cl.
CPC .............. *H04B 7/26* (2013.01); *G01L 19/086* (2013.01); *G01M 3/2876* (2013.01)

(58) Field of Classification Search
CPC ....... H05B 7/26; G01L 19/086; G01L 27/002; G01L 27/005; G01M 3/2876; G06C 30/018; G06C 50/06
See application file for complete search history.

(56) References Cited

U.S. PATENT DOCUMENTS

| | | | |
|---|---|---|---|
| 5,257,208 A * | 10/1993 | Brown | F16K 37/0091 340/626 |
| 6,675,110 B2 * | 1/2004 | Engelmann | F16K 37/0091 137/112 |
| 9,476,805 B2 * | 10/2016 | Doran | G01M 99/008 |
| 2009/0157521 A1 * | 6/2009 | Moren | G06Q 10/10 705/1.1 |
| 2012/0030250 A1 * | 2/2012 | Eisenhauer | G06Q 50/06 707/803 |
| 2014/0330731 A1 * | 11/2014 | Helfrich | G06Q 30/018 705/317 |
| 2015/0226628 A1 * | 8/2015 | Stering | G01L 27/005 73/1.63 |

OTHER PUBLICATIONS

Internet Archive Wayback Machine, Nexus One Phone—Features overview & Technical specifications, Jan. 8, 2010, pp. 1-4.*

* cited by examiner

*Primary Examiner* — Leslie J Evanisko
*Assistant Examiner* — Leo T Hinze
(74) *Attorney, Agent, or Firm* — Frost Brown Todd LLC

(57) ABSTRACT

A tester that measures pressure includes at least one pressure input port, at least one transducer, GPS communications, and a controller. The transducer measures pressure of the pressure input port. The controller is coupled with the transducer and the GPS communications such that the controller associates location data provided by the GPS communications with the pressure measured by the transducer to create a test result.

20 Claims, 26 Drawing Sheets

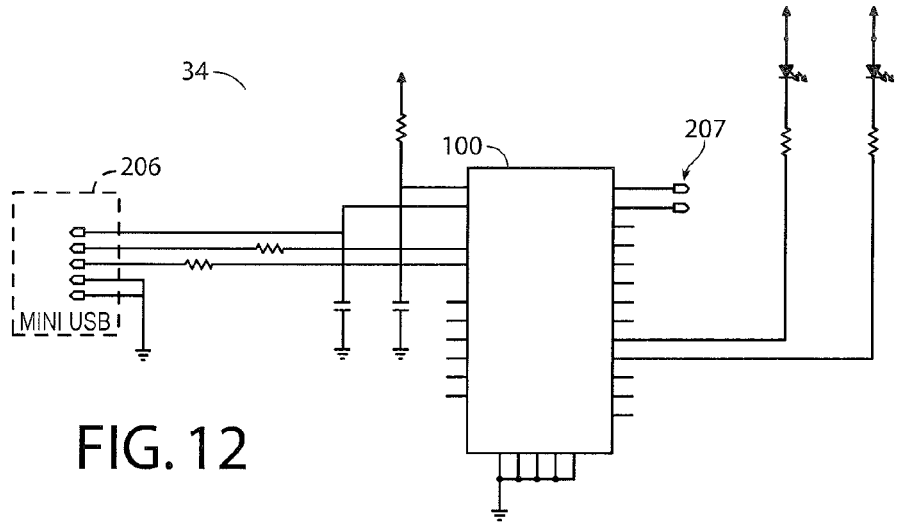
FIG. 12
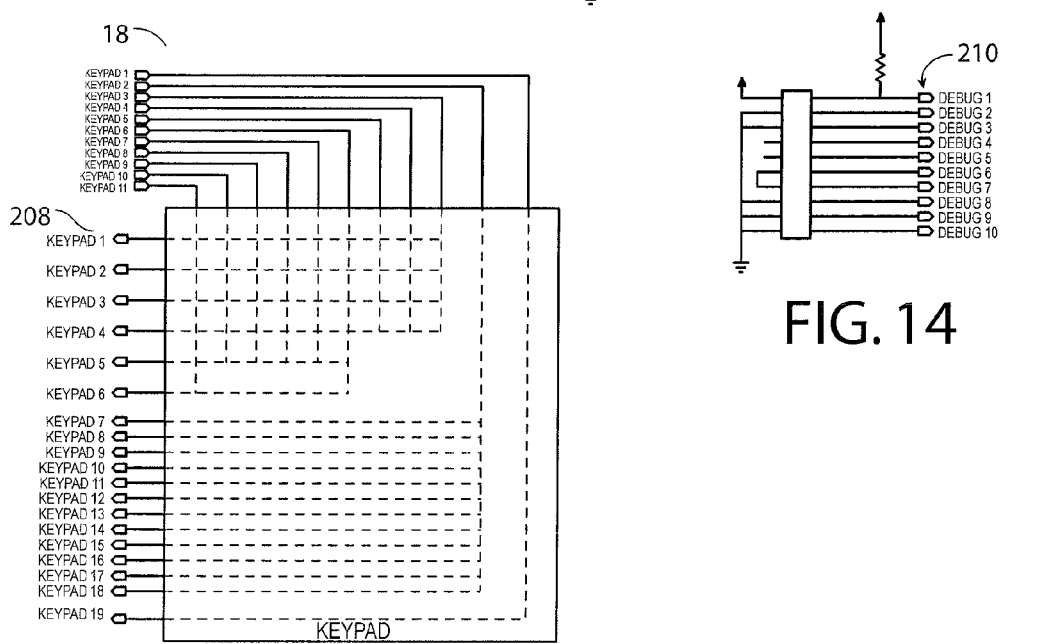
FIG. 13
FIG. 14
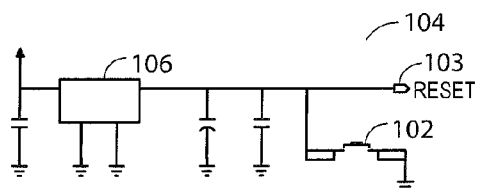
FIG. 15

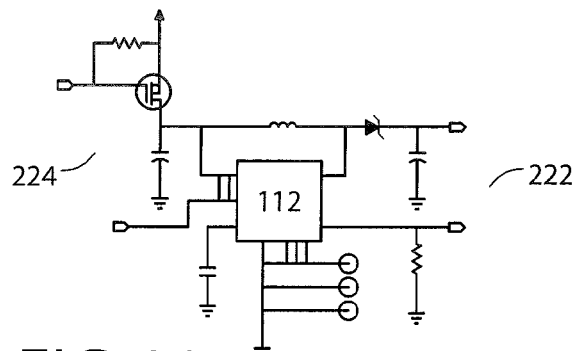
FIG. 22
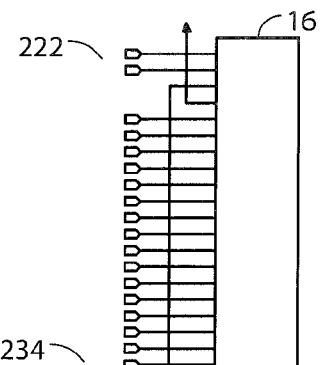
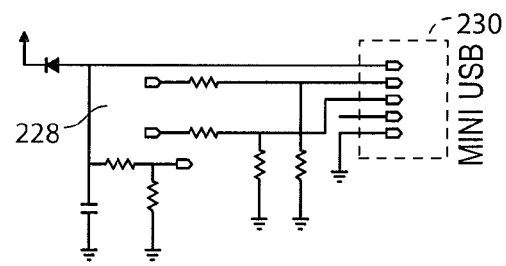
FIG. 23
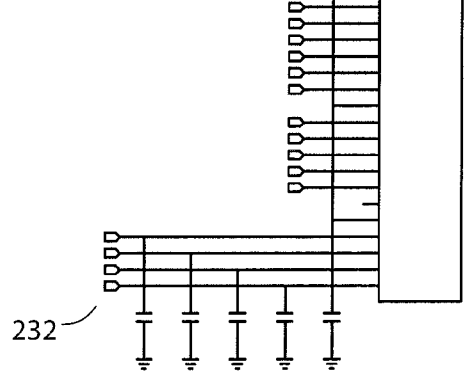
FIG. 24
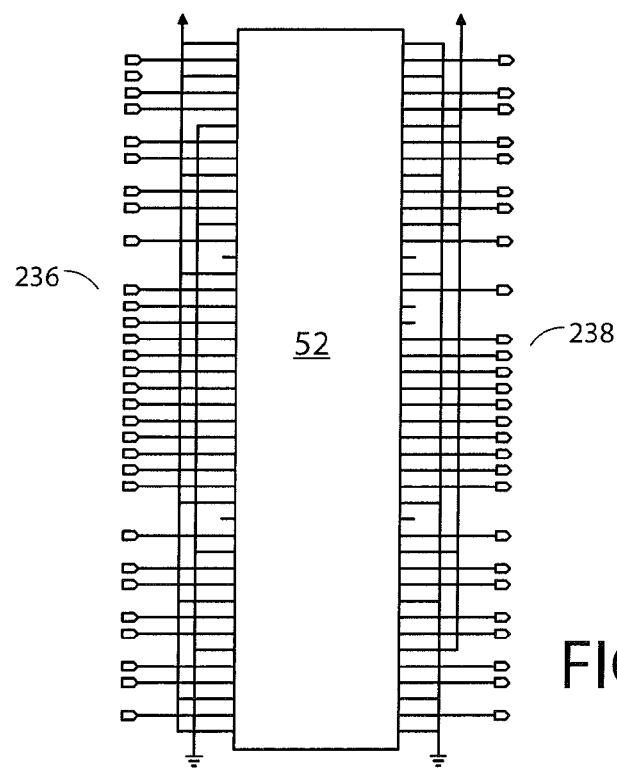
FIG. 25

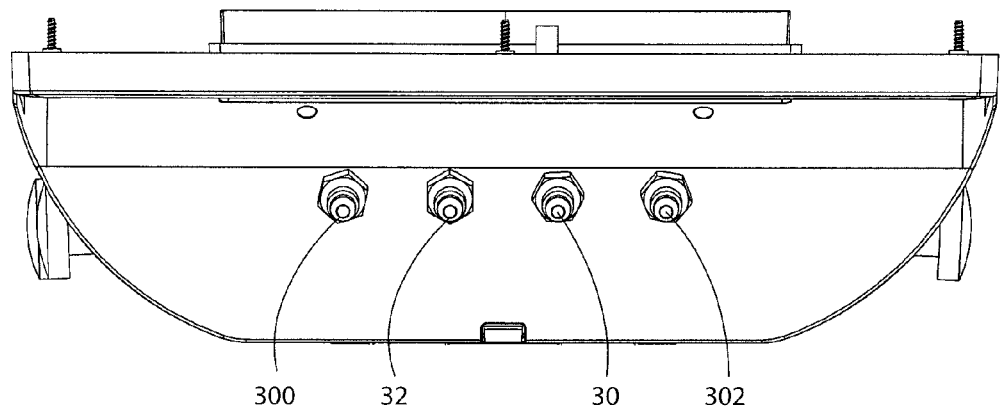
FIG. 31
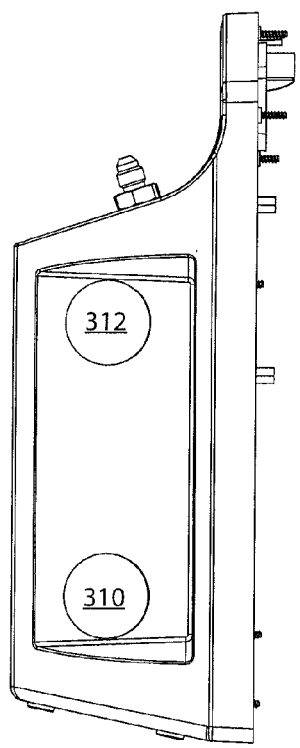 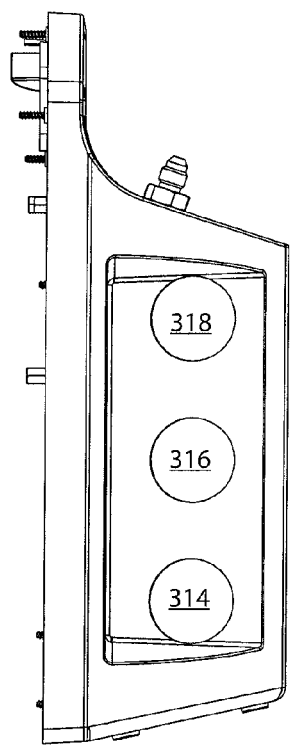
FIG. 32  FIG. 33

JOB SHEET

Device Location — 1202
Address:
City:
State:
Zip Code:
Township:

— 1204 (map)

— 1200

Owner Details - — 1206
Company Name:
Contact Name:
Email Id:
Address:
City:
State:
Zip Code:
Business Phone Number:
Cell Phone Number:
Notes:

Device Details - — 1208
Serial Number:
Manufacturer:
Model:
Size (Water Line):
Date of Test:

Double Check Assembly — 1210

| Double Check Assembly | | |
|---|---|---|
| outlet valve | | Pass |
| 1st check valve | Psid-68 | Fail |
| 2nd check valve | Psid-73 | |

— 1214

| Repairs & Materials Used |
|---|
| Replace Piston |

— 1216

| Re-Test After repairs | | |
|---|---|---|
| outlet valve | | Pass |
| 1st check valve | Psid-56 | Pass |
| 2nd check valve | Psid-78 | Pass |

— 1218

CERTIFICATION (Tester) — 1220
I hereby certify the above test date to be correct and that the above backflow prevention device is in proper operating condition.

State Backflow #:        TESTER (Printed):        Work Phone:        Exp. Date:

— 1222
TESTER (Signature):

— 1224
OWNER REPRESENTATIVE (Signature):

FIG. 44

COMBINATION TESTER

PRIORITY

This application claims priority to U.S. Provisional Patent Application Ser. No. 61/865,453, entitled "Combination Tester," filed on Aug. 13, 2013, the disclosure of which is incorporated by reference herein.

BACKGROUND

A backflow prevention device may be positioned between a building and a potable water supply to protect the water supply from contamination or pollution due to backflow of water from a user into the water supply. Such backflow prevention devices are tested frequently to ensure that the devices are working properly. Multiple testing tools may be used to test such backflow prevention devices, such as a gas leak tester, a manometer, and a backflow test kit. It may therefore be desirable to combine these tools into a combination tester. Further, the data gathered by these testing tools is typically not protected such that reporting of the results of the tests depends merely on the tester, which may be subject to mistakes or falsification. Accordingly, it may be desirable to provide technology to the testing tools for automated reporting of the test results to increase the reliability of the results. As such, there is a need for improved backflow prevention device testing devices and methods.

BRIEF DESCRIPTION OF THE DRAWINGS

While the specification concludes with claims which particularly point out and distinctly claim the invention, it is believed the present invention will be better understood from the following description of certain embodiments taken in conjunction with the accompanying drawings, in which like reference numerals identify the same elements.

FIG. 12 depicts a diagram of a USB port interface of the electronic system of FIG. 7.

FIG. 13 depicts a diagram of a keypad interface of the electronic system of FIG. 7.

FIG. 14 depicts a diagram of a debugging system of the electronic system of FIG. 7.

FIG. 15 depicts a diagram of a reset system of the electronic system of FIG. 7.

FIG. 22 depicts a diagram of an LED system of the electronic system of FIG. 7.

FIG. 23 depicts a diagram of another USB port interface of the electronic system of FIG. 7.

FIG. 24 depicts a diagram of a display of the electronic system of FIG. 7.

FIG. 25 depicts a diagram of a memory of the electronic system of FIG. 7.

FIG. 31 depicts a top plan view of the combination tester of FIG. 30.

FIG. 32 depicts a side elevational view of the combination tester of FIG. 30.

FIG. 33 depicts a side elevational view of the combination tester of FIG. 30.

FIG. 44 depicts a test result form for the backflow test of FIG. 43.

Figure 1:
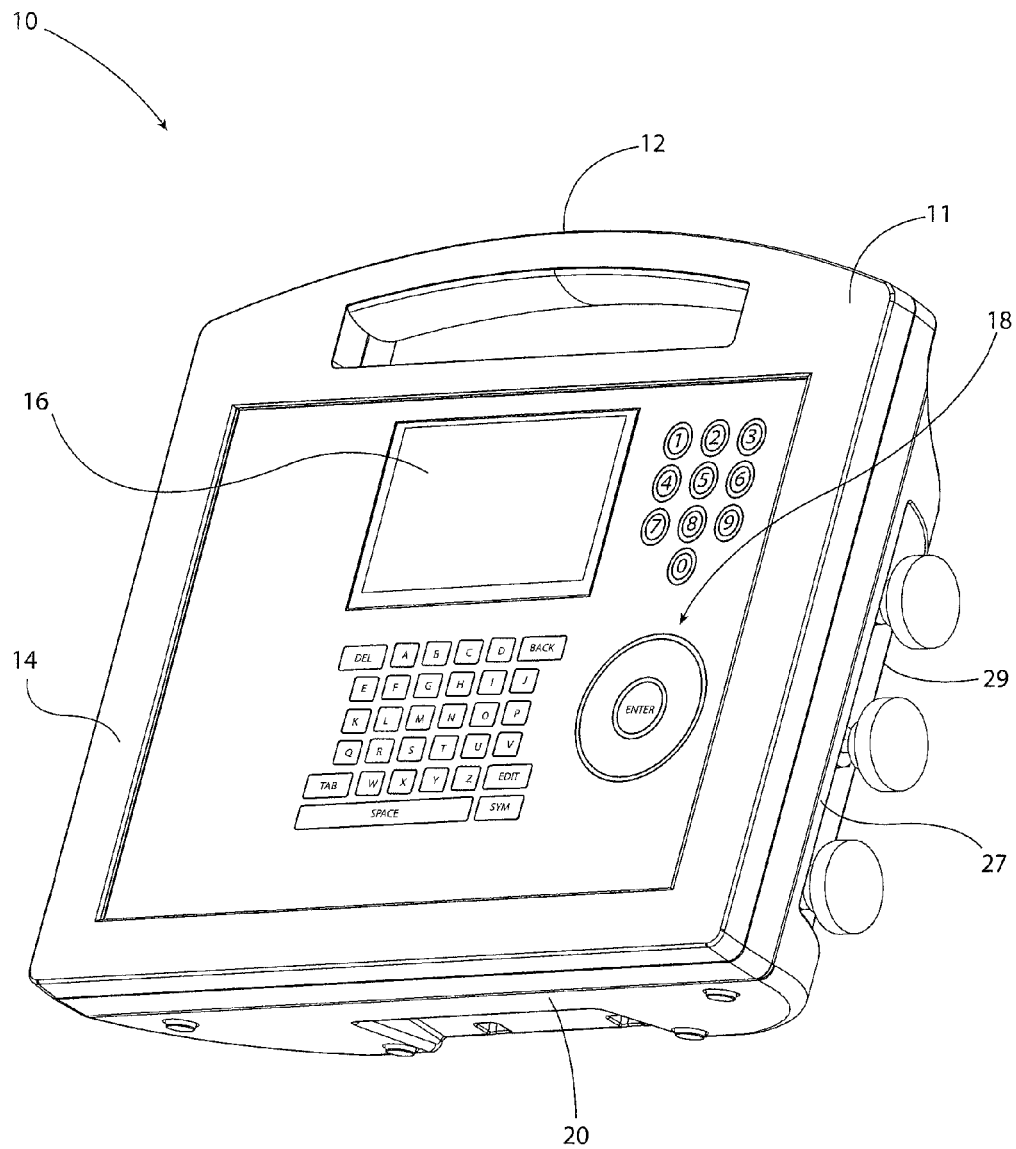
FIG. 1 depicts a front perspective view of a combination tester.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain embodiments of the present disclosure should not be used to limit the scope of the present disclosure. Other examples, features, aspects, embodiments, and advantages of the invention will become apparent to those skilled in the art from the following description. As will be realized, various aspects of the present disclosure may take alternate forms, or have alternate or additional embodiments, without departing from the scope of the present disclosure. Accordingly, the drawings and descriptions should be regarded as illustrative in nature and not restrictive.

A combination tester includes a combination of plumbing tools, such as a Gas Leak Tester, a Manometer, and a Backflow Test Kit, into one portable handheld device. To increase the accuracy of the test results, the tester is capable of displaying, recording, data logging, transferring, and printing results of multiple pressure tests. Such a combination tester and method of operation is described in more detail below.

I. Components of a Combination Tester

Combination tester (10) comprises pressure input ports (30, 32) coupled to transducers (60, 62), an electronic system (13), and a valve assembly (15), stored within a handheld housing (11), that are configured to read and calculate differential pressures for a variety of plumbing devices. Pressure input ports (30, 32) and transducers (60, 62) are operable to read both high and low pressures. Electronic system (13) comprises GPS communications (82) to tag the location of the tests, which helps to prevent falsification of test results. Tester (13) can then store the test results and/or transfer the test results via wireless communications (80), Bluetooth communications (84), and/or USB port (34), which will be described in more detail below.

A. Housing

Figure 3:
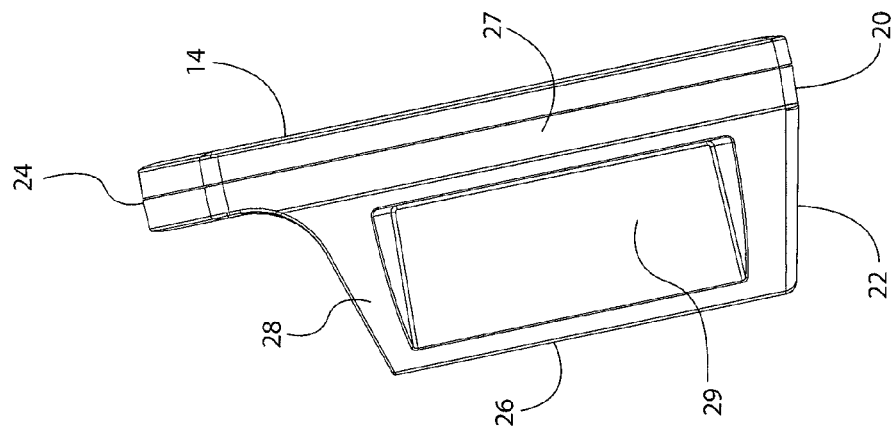
FIG. 3 depicts a side elevational view of the combination tester of FIG. 1.
Figure 2:
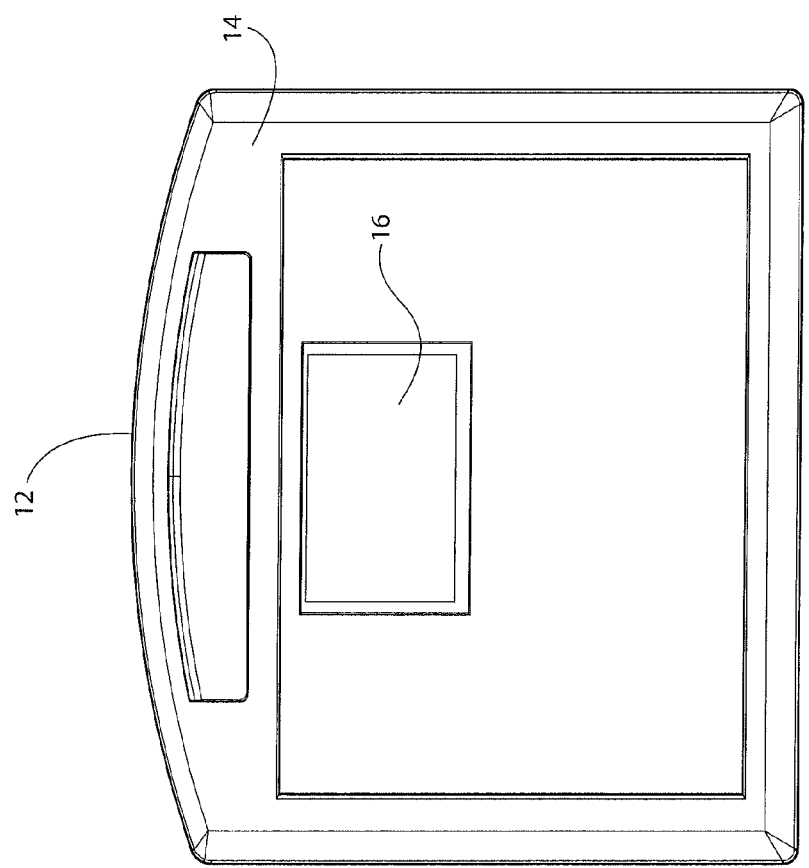
FIG. 2 depicts a front view of the combination tester of FIG. 1.
Figure 4:
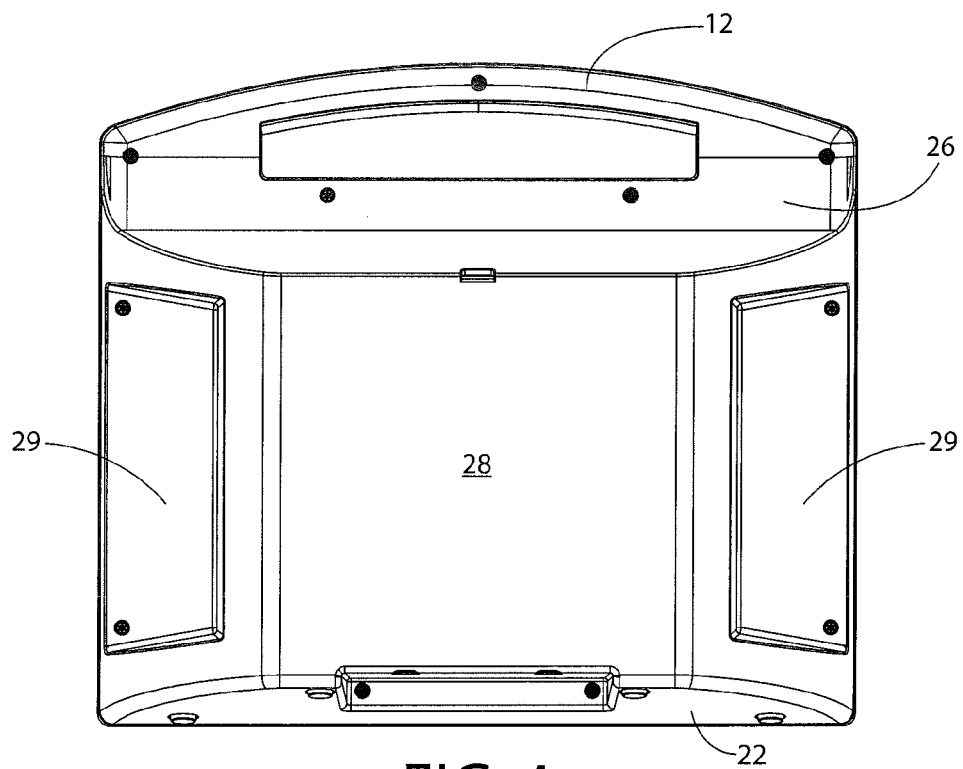
FIG. 4 depicts a back view of the combination tester of FIG. 1.
Figure 5:
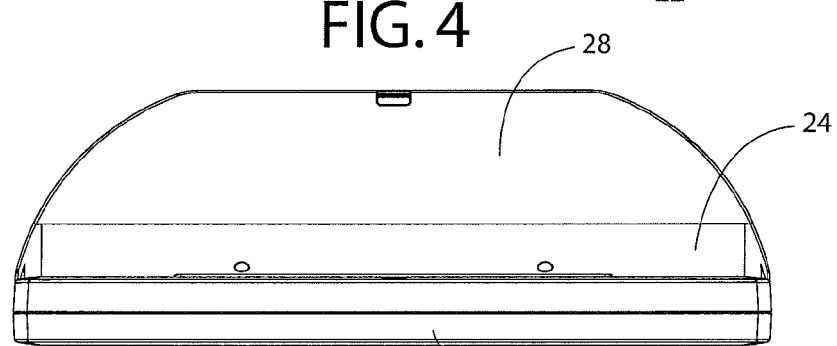
FIG. 5 depicts a top plan view of the combination tester of FIG. 1.
Figure 6:
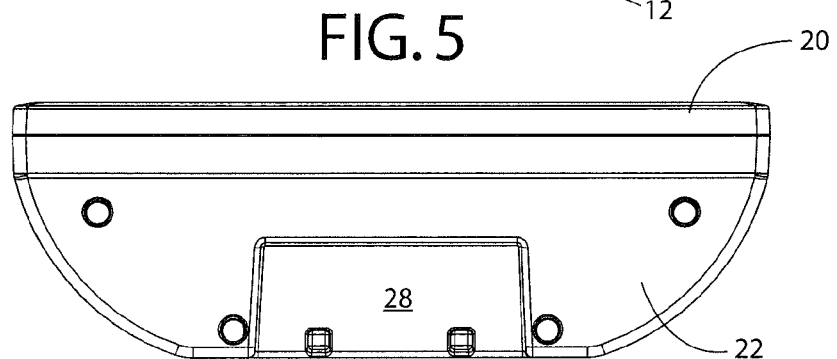
FIG. 6 depicts a bottom plan view of the combination tester of FIG. 1.
Figure 35:
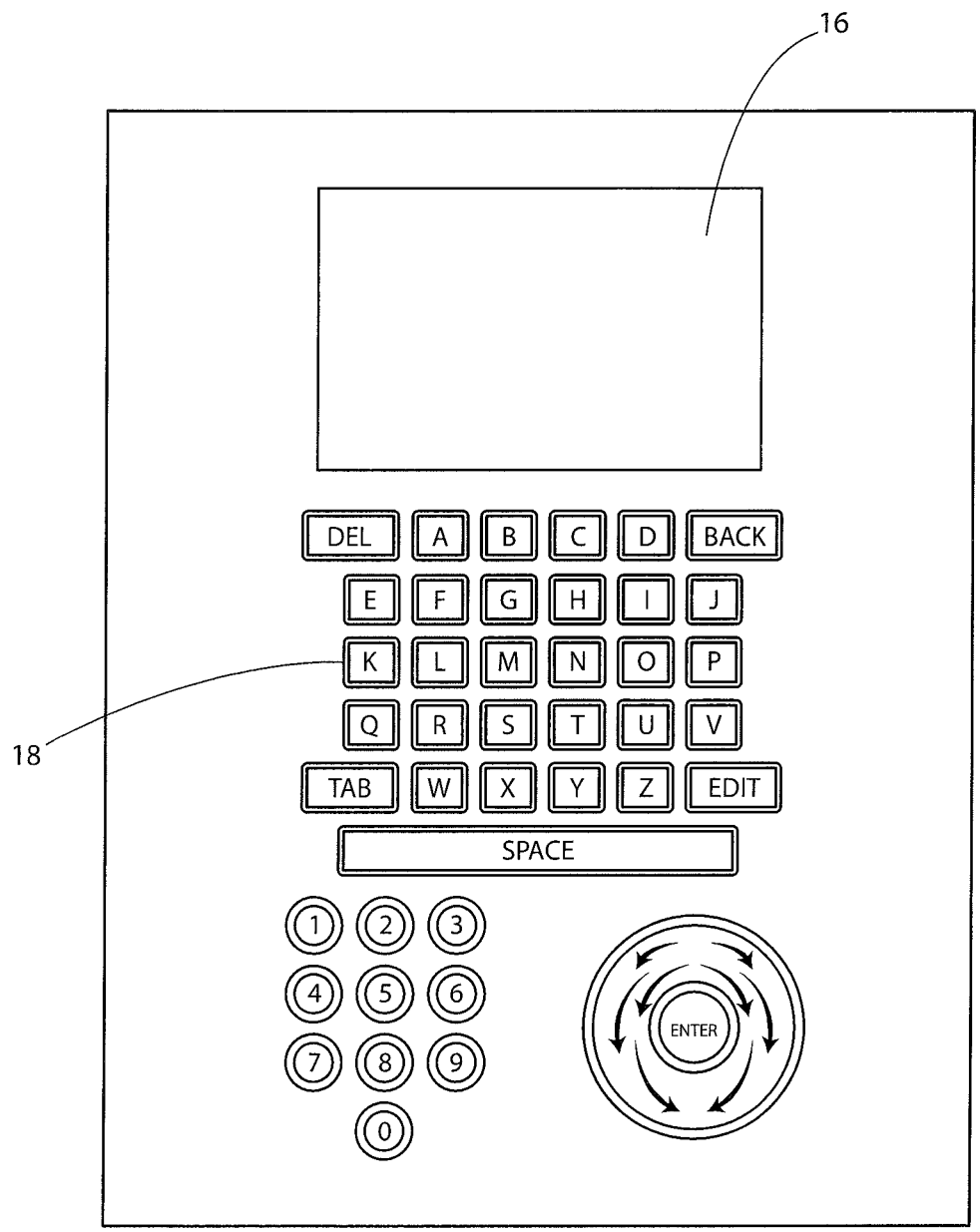
FIG. 35 depicts a front view of a display screen of the combination tester of FIG. 1.

FIGS. 1-6 show housing (11) of tester (10), which comprises a front surface (14), a top surface (24), a rear surface (26), a bottom surface (20), and opposing side surfaces (27). As best seen in FIGS. 1 and 35, front surface (14) includes a display screen (16) and a keypad (18). Display screen (16) is operable to display information to a user, such as menu options, test results, etc. A user may enter instructions or other information for tester (10) using keypad (18). Display screen (16) and keypad (18) may be incorporated into a single touch screen, or display screen (16) and keypad (18) may be separate such that keypad (18) comprises a plurality of push buttons. Other suitable configurations for display screen (16) and/or keypad (18) will be apparent to one with ordinary skill in the art in view of the teachings herein. Side surface (27) is shown in FIG. 3, which comprises a recess (29). Recess (29) may allow a user to more easily grip tester (10) by allowing the user to wrap his/her fingers around side surface (27) and into recess (29). FIG. 3 further shows bottom surface (20) of tester (10) comprising a ramped surface (22). Tester (10) may be positioned on ramped surface (22) to angle display screen (16) and keypad (18) toward the user to allow the user to more easily interface with combination tester (10). For instance, ramped surface (22) include about a 12 degree angle relative to bottom surface (20), but other suitable configurations for ramped surface (22) will be apparent to one with ordinary skill in the art in view of the teachings herein. A battery compartment (28) extends between front surface (14) and rear surface (26) to hold a plurality of batteries that may be used to power tester (10).

Housing (11) of combination tester (10) is sized to be handheld such that a user can easily transport tester (10). For instance, housing (10) may have a width of about 14 inches, a height of about 12 inches, and a depth of about 4.5 inches. Of course, other suitable dimensions for housing (11) will be apparent to one with ordinary skill in the art in view of the teachings herein. Housing (11) further comprises a handle (12) for increased portability.

B. Electronic System

Figure 7:
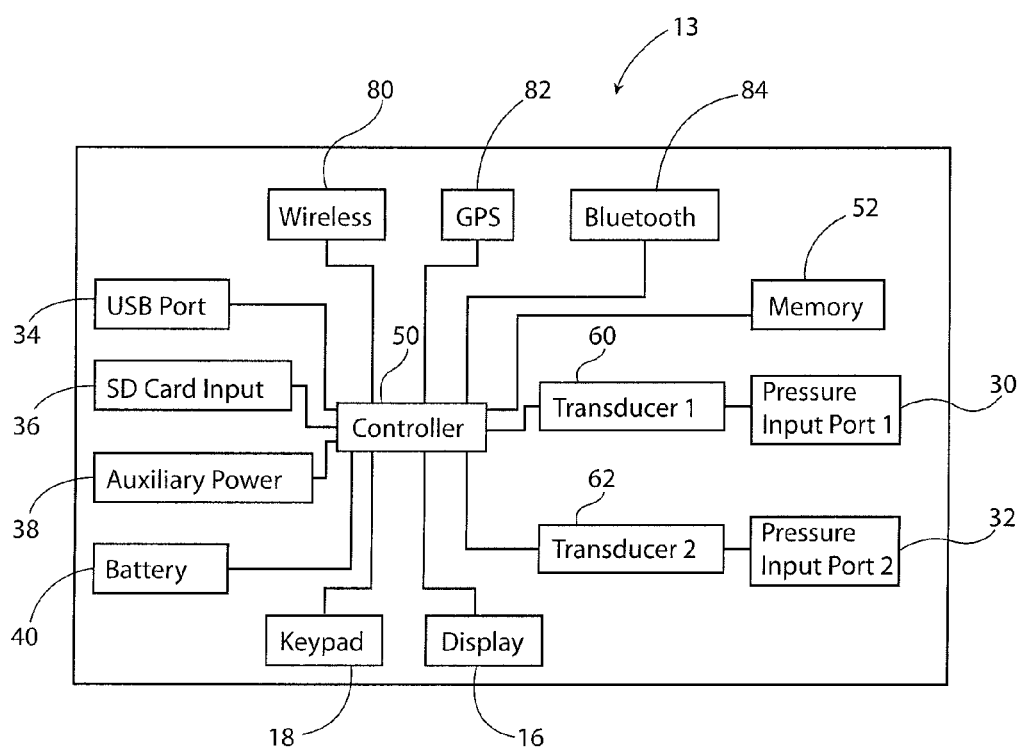
FIG. 7 depicts a block schematic an electronic system of the combination tester of FIG. 1.
Figure 8:
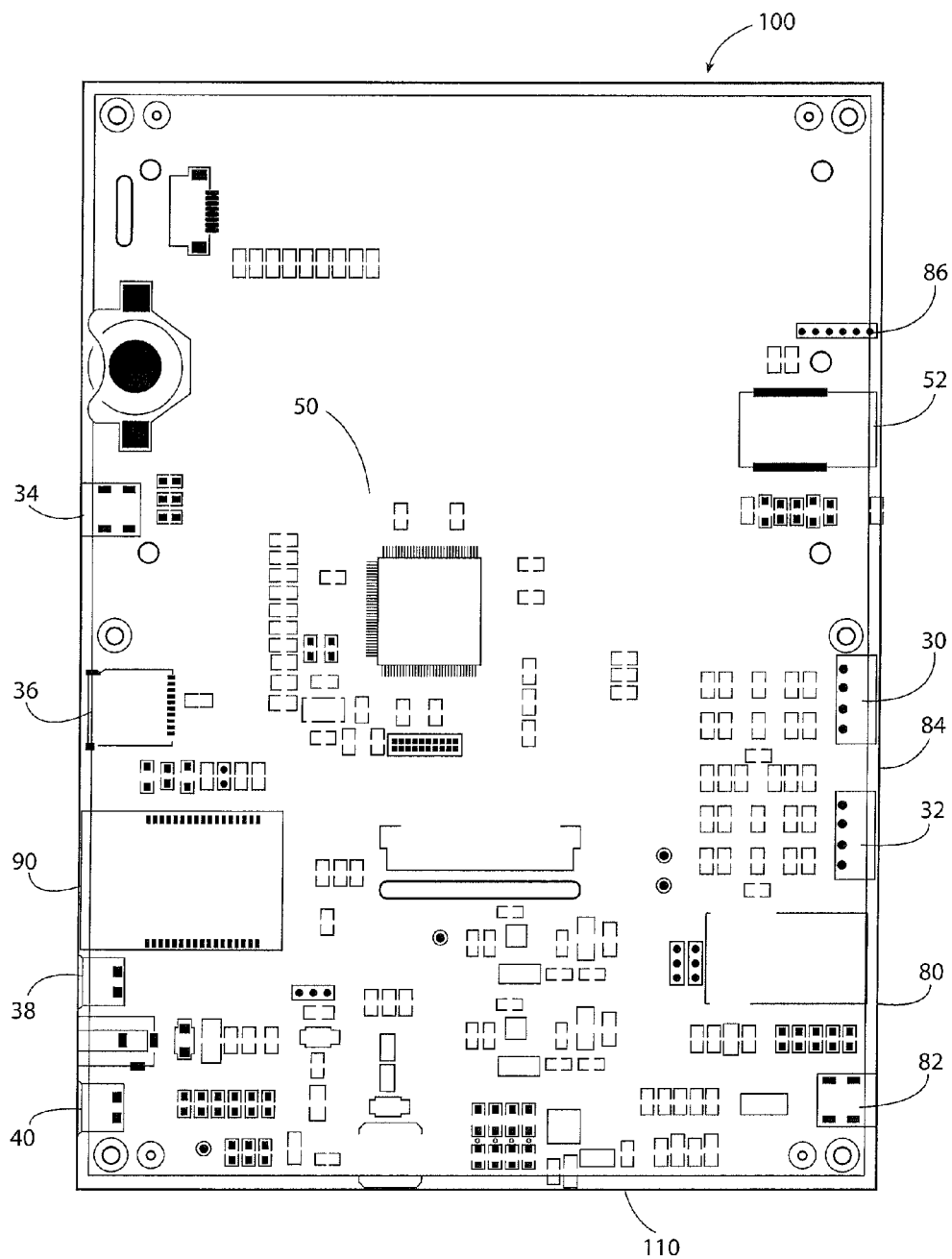
FIG. 8 depicts a diagram of a circuit of the electronic system of FIG. 7.

FIG. 7 shows a block schematic of electronic system (13) used in combination tester (10). In the present embodiment, pressure readings are communicated to controller (50) through pressure input ports (30, 32) and transducers (60, 62), respectively. GPS communications (82) are coupled with controller (50) to associate location data with each pressure reading. This enables purveyors to verify that the user was on site to perform the test. GPS communications (82) may also allow the user to locate tester (10) if tester (10) was lost or stolen. Controller (50) is then operable to process these pressure readings and/or location data. Controller (50) may store the information in memory (52) and/or display the information on display screen (16). SD Card input (36) is coupled with controller (50) to provide additional memory for tester (10) if needed. Controller (50) is further operable to transfer the information to other devices through wireless communications (80), Bluetooth communications (84), and/or USB port (34).

Wireless communications (80) may connect tester (10) to a Wi-Fi network to allow tester (10) to communicate with web based portals. Accordingly, tester (10) may automatically transfer information to web based storage or database whenever tester (10) detects the presence of a Wi-Fi connection. This may minimize the loss of data if an error were to occur with tester (10). Alternatively, the user may selectively transfer information from tester (10) through wireless communications (80) to such web based storage manually. Wireless communications (80) may also be used to transfer information from tester (10) to other devices. For example, a user can email information to a computer or a cellular phone. Information, such as software upgrades, can also be sent to tester (10) through wireless communications (80). Wireless communications (80) may further allow a user to order replacement parts after viewing the results of a test. Bluetooth communications (84) is coupled with controller (50) to enable tester (10) to wirelessly send and/or receive information with other Bluetooth devices, such as a printer, computer, cellular phone, etc. Alternatively, USB port (34) is available for wired connections to and from tester (10) to computer based devices. USB port (34) may be a mini-USB port. Other suitable methods for transferring information to and/or from tester (10) will be apparent to one with ordinary skill in the art in view of the teachings herein.

Electronic system (13) further comprises a battery (40) to provide power to tester (10). Battery (40) may include rechargeable AA batteries and/or standard alkaline batteries. Auxiliary power (38) is also provided for tester (10) such that tester (10) can be directly powered by an exterior power source.

Figure 9:
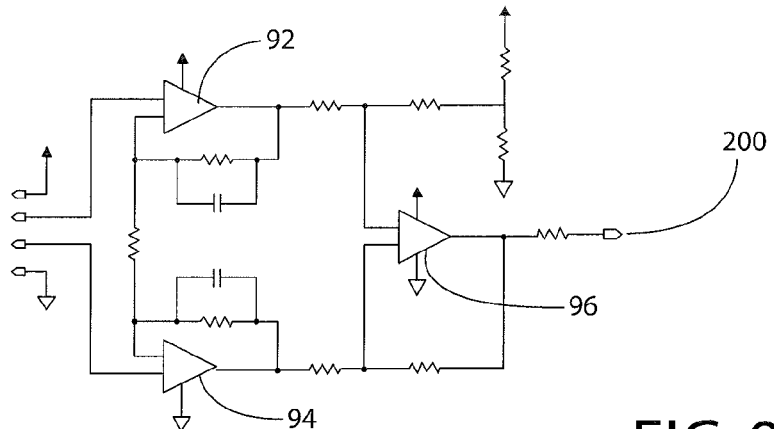
FIG. 9 depicts a diagram of a low pressure input of the electronic system of FIG. 7.
Figure 10:
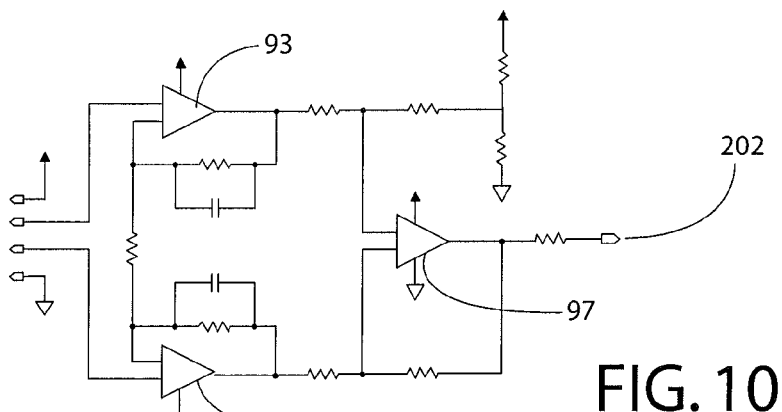
FIG. 10 depicts a diagram of a high pressure input of the electronic system of FIG. 7.
Figure 11:
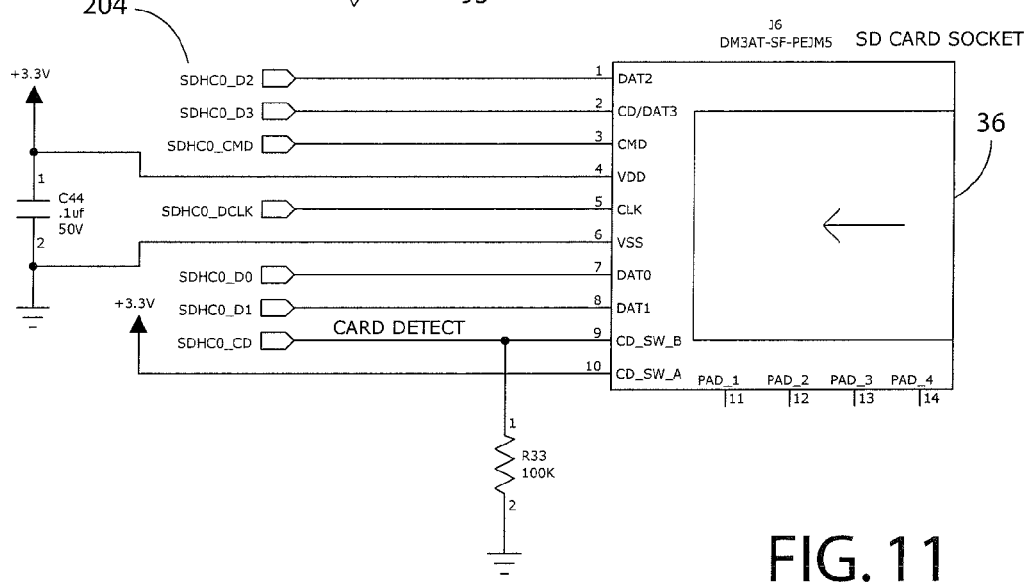
FIG. 11 depicts a diagram of an SD card interface of the electronic system of FIG. 7.
Figure 20:
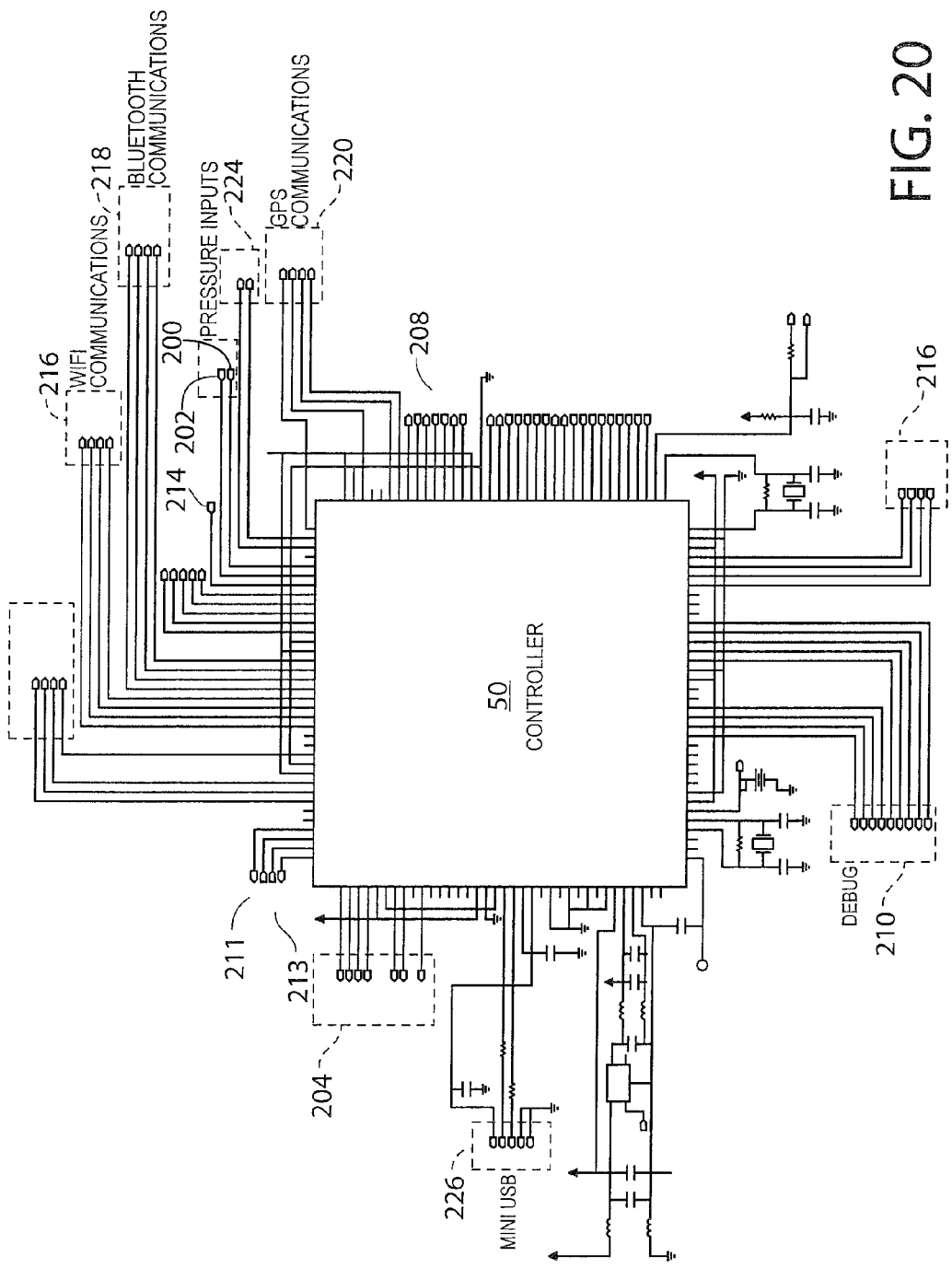
FIG. 20 depicts a diagram of a microcontroller of the electronic system of FIG. 7.

FIGS. 9 and 10 show pressure signals (200, 202) received from each pressure input (30, 32) through transducers (60, 62), respectively. In the present embodiment, pressure signals (200, 202) have been sent through amplifiers (92, 93, 94, 95, 96, 97). Amplifiers (92, 93, 94, 95, 96, 97) may be Zero Drift, Low Noise Op Amps to amplify pressure signals (200, 202) with a high amount of accuracy. For instance, amplifiers (92, 94, 93, 95) may be LMP2022MA Precision Amplifiers manufactured by Texas Instruments Inc., located in Dallas, Tex. and/or amplifiers (96, 97) may be LMP2021MA Precision Amplifiers manufactured by Texas Instruments Inc., located in Dallas, Tex. Pressure signals (200, 202) are then communicated to controller (50), as shown in FIG. 20. Other pressure signal configurations will be apparent to one with ordinary skill in the art in view of the teachings herein. FIG. 11 shows a diagram of SD card input (36) in communication with controller (50) through SD card signals (204).

FIG. 12 shows a diagram of an interface between controller (50) and USB port (34). This interface communicates with USB port (34) through USB signals (206) that are sent through an integrated circuit (100), such as an FTDI Chip that is manufactured by Future Technology Devices International Ltd., located in Glasgow, UK. Of course, other USB signal configurations will be apparent to one with ordinary skill in the art in view of the teachings herein. In the present embodiment, GPS signals (207) are being communicated between USB port (34) and controller (50) via GPS communications (82) shown in FIG. 19. FIG. 13 illustrates an interface between keypad (18) and controller (50). Communication between keypad (18) and controller (50) is provided by keypad signals (208). FIG. 14 shows debugging signals (210), which are sent to controller (50). These signals may be used during testing of tester (10) and/or for future software updates.

Tester (10) may be reset to clear desired information from tester (10). A user may selectively reset tester (10) by pressing reset button (102), shown in FIG. 15. This transmits reset signal (103) to controller (50) and other systems within tester (10). Reset signal (103) may also be transmitted automatically, such as after a power failure, by comparator circuit (106). For instance, comparator circuit (106) monitors the status of the power supply for tester (10) and when an out-of-tolerance condition is detected, comparator circuit (106) sends reset signal (103). Comparator circuit (106) may be an EconoReset manufactured by Maxim Integrated in San Jose, Calif. Other reset signal configurations will be apparent to one with ordinary skill in the art in view of the teachings herein.

Figure 16:
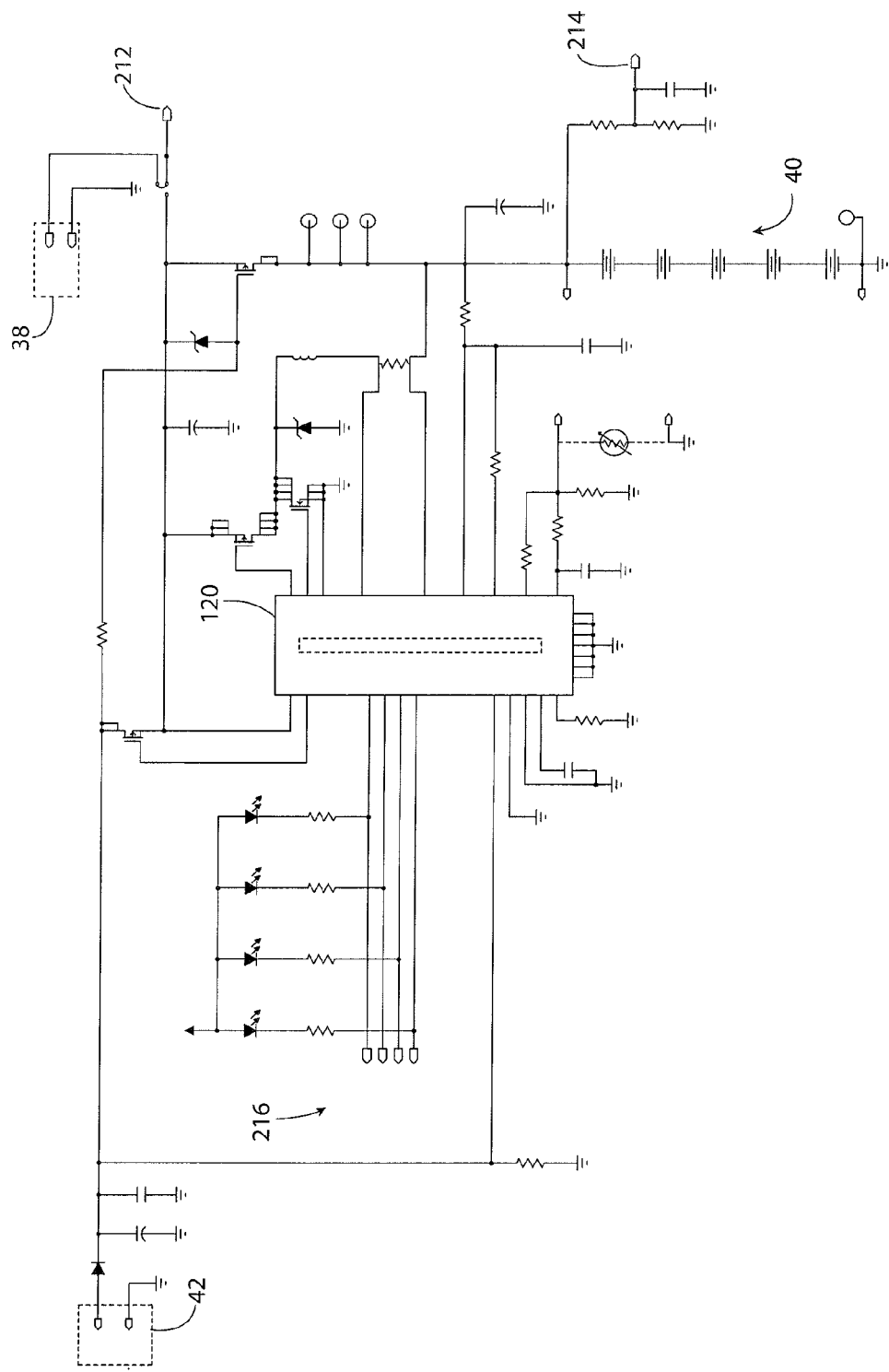
FIG. 16 depicts a diagram of a power system of the electronic system of FIG. 7.

FIG. 16 shows a diagram of an interface between battery (40) and controller (50) (FIG. 20). The voltage of battery (40) is communicated to controller (50) via battery signal (214). If controller (40) detects that the voltage of battery (40) is low, battery (40) can be charged by battery charger (120). Battery charger (120) communicates with controller (50) through battery charger signals (216). If needed, battery charger (120) can be coupled with a power source via adapter (42). Alternatively, tester (10) can be powered by auxiliary power supply (38). The voltage needed to operate tester (10) is transmitted through system signal (212), which may be provided by battery (40) or auxiliary power supply (38), as shown in FIG. 16.

Figure 17:
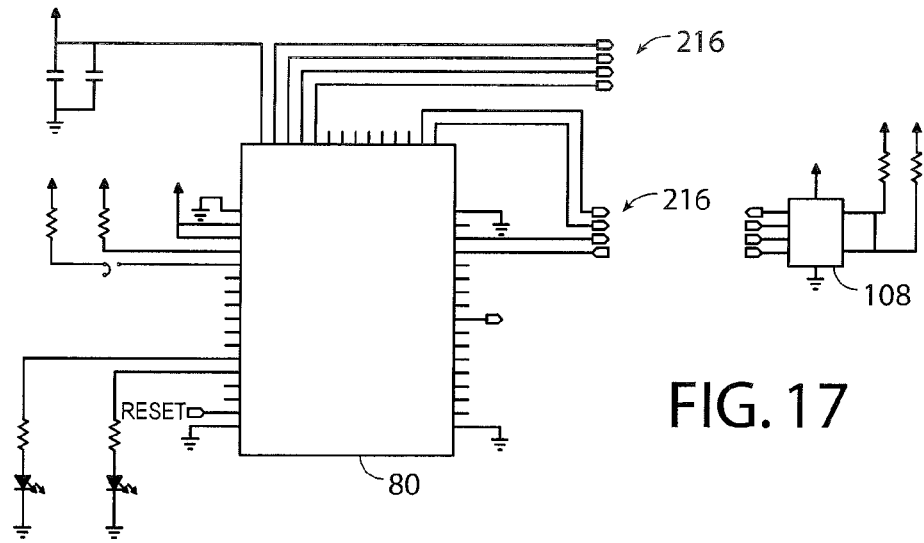
FIG. 17 depicts a diagram of a wireless system of the electronic system of FIG. 7.

A diagram of wireless communications (80) is shown in FIG. 17. Wireless communications (80) comprises a Wi-Fi module to enable Wi-Fi connectivity. Such a module may operate with standard 802.11b/g/n access points at speeds up to about 72 Mb/s. Wi-Fi module can be a TWR-WIFI-GS1500M 802.11 Wi-Fi Tower System Module manufactured by Freescale Semiconductor Inc., located in Austin, Tex. Wireless communications (80) may enable tester (10) to connect to the internet and/or other Wi-Fi devices for peer-to-peer networking. In the present embodiment, wireless communications (80) further comprises a flash memory (108), which may be used to store Wi-Fi networks and/or databases. Wireless communications (80) sends and/or receives Wi-Fi signals (50) with controller (50) to operate wireless communications (80). Other Wi-Fi signal configurations will be apparent to one with ordinary skill in the art in view of the teachings herein.

Figure 18:
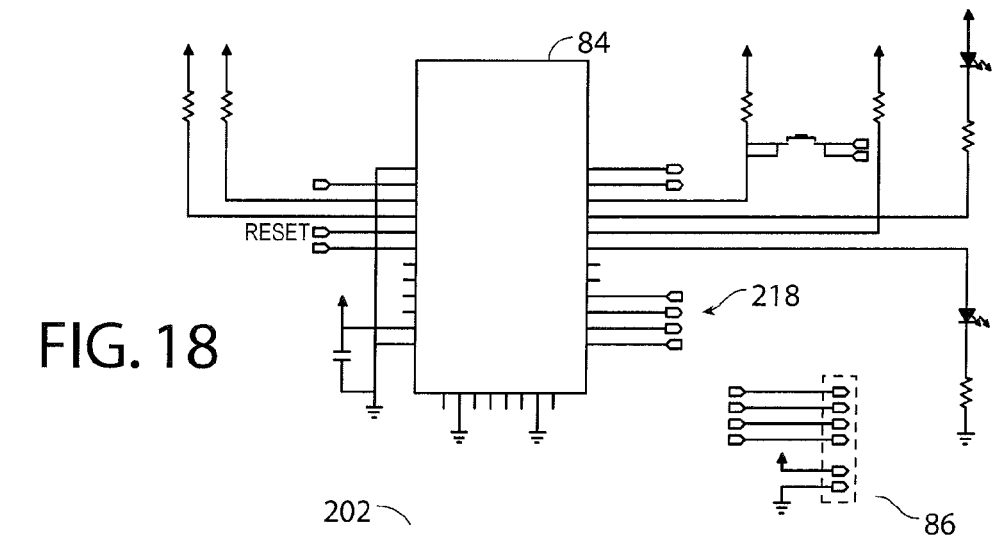
FIG. 18 depicts a diagram of a Bluetooth system of the electronic system of FIG. 7.

A diagram of Bluetooth communications (84) is shown in FIG. 18. Bluetooth communications (84) includes a Bluetooth module for enabling tester (10) with Bluetooth capability. Such a Bluetooth module can be a RN-42/RN-42-N Class 2 Bluetooth Module manufactured by Roving Networks, Inc., located in Los Gatos, Calif. The Bluetooth module includes a radio operable to communicate with devices up to about 60 feet away at a frequency between about 2404 and 2480 MHz. Bluetooth communications (84) is operable to display whether the Bluetooth module is discoverable and waiting for a connection, whether the module is in command mode, and/or whether the module is connected to another device. Bluetooth communications (84) communicates with controller (50) through Bluetooth signals (218) to operate Bluetooth communications (84). Bluetooth communications (84) can be programmed by a user through programming header (86). Other Bluetooth configurations will be apparent to one with ordinary skill in the art in view of the teachings herein.

Figure 19:
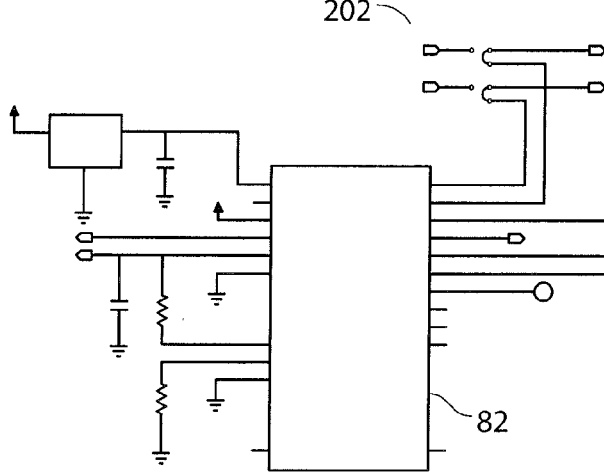
FIG. 19 depicts a diagram of a GPS system of the electronic system of FIG. 7.

GPS communications (82), shown in FIG. 19, comprises a GPS antenna module to provide location and/or time data for tester (10). For instance, the GPS module can be a A2035-H GPS Antenna Module Sub System, manufactured by Maestro Wireless Solutions Ltd., located in Hong Kong. GPS communications (82) communicates with controller (50) via GPS signals (220). Other GPS signal configurations will be apparent to one with ordinary skill in the art in view of the teachings herein.

FIG. 20 shows controller (50) operable to control tester (10) by sending and/or receiving signals with systems within tester (10). For instance, controller (50) receives pressure values from each pressure input port (30, 32) through transducers (60, 62) by pressure signals (200, 202). Controller (50) can then process those pressure signals (200, 202), such as by calculating a pressure differential and/or comparing pressure signals (200, 202) with a predetermined value. Controller (50) can transmit these results to display screen (16), which will be described in more detail below, or transmit them to another device through Wi-Fi signals (216), Bluetooth signals (218), and/or USB signals (226). Controller (50) can also store the results in memory (52) and/or SD card input (36) through SD card signals (226). Controller (50) can send and/or receive instructions from keypad (18) to interface with a user through keypad signals (208). Controller (50) can further operate battery (40) by communicating battery signal (214) and battery charger signals (216) with battery (40). Controller (50) may be a MK60DN512ZVLQ10 Microcontroller, manufactured by Freescale Semiconductor Inc., located in Austin, Tex. Other controller configurations will be apparent to one with ordinary skill in the art in view of the teachings herein.

Figure 21:
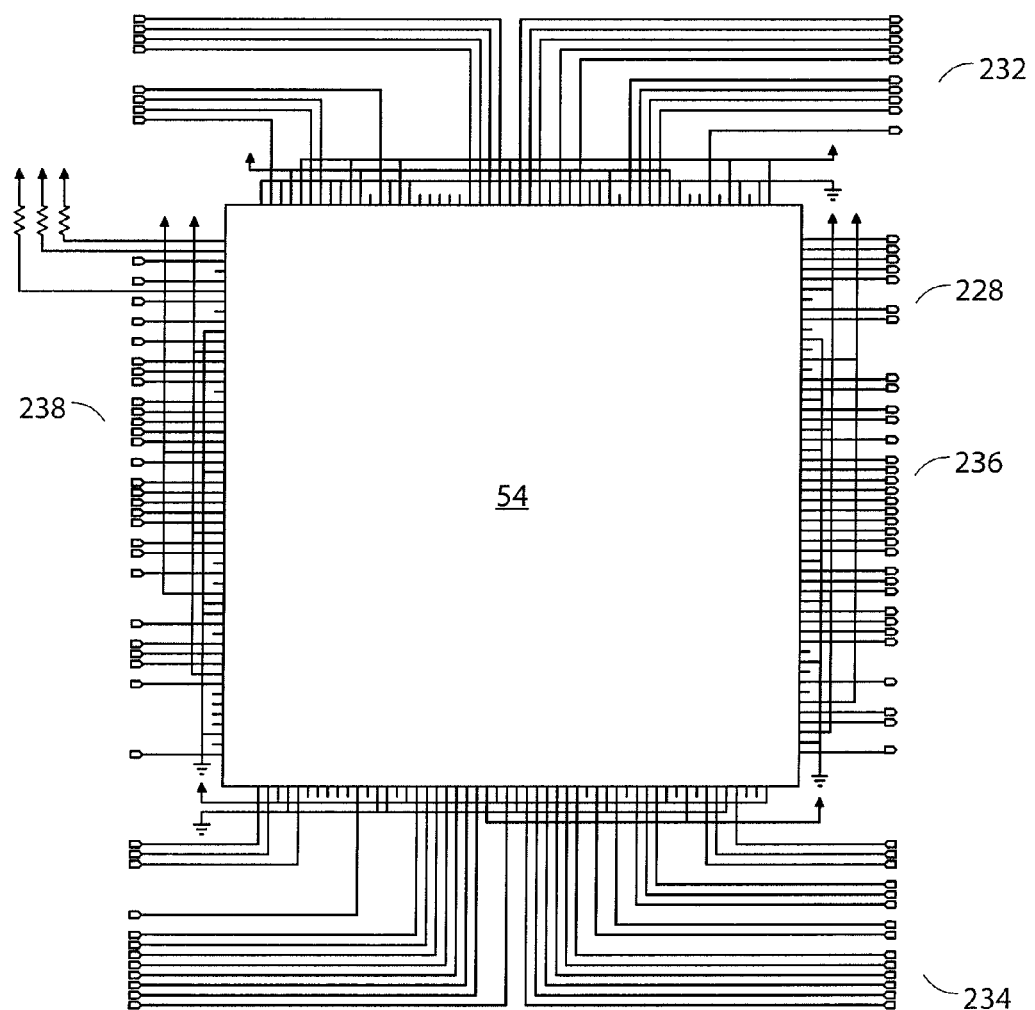
FIG. 21 depicts a diagram of a controller of the electronic system of FIG. 7.

Controller (50) further comprises a display controller (54) shown in FIG. 21. Display controller (54) communicates data from controller (50) with memory (52) to store data and with display (16) to allow a user to view data within tester (10). For instance, display controller (54) sends memory signals (236) to memory (52) to store the data from controller (50) within memory (52) (FIG. 25). Display controller (54) can then pull the data from memory (52) through stored memory signals (238). Memory (52) can be a IS42S32800D-6TL 256 Mb Synchronous DRAM, manufactured by Integrated Silicon Solution Inc., located in Milpitas, Calif. Display controller (54) further communicates with display screen (16) by sending and/or receiving pixel signals (234) and/or touch screen signals (234) (FIG. 24). For example, pixel signals (234) communicate information to display within selected pixels of display screen (16). Touch screen signals (234) communicate signals to and/or from display screen (16) if display screen (16) is a touch screen. The lighting of display screen (16) can be adjusted through controller (50) by LED signals (222, 224). Display controller (54) can also communicate with USB port (34) via USB signals (228) (FIG. 23). Display controller (54) can be a AGB75LC04-QU-E LCD Controller Chip manufactured by Amulet Technologies, located in Campbell, Calif. Other display controller configurations will be apparent to one with ordinary skill in the art in view of the teachings herein.

Figure 26:
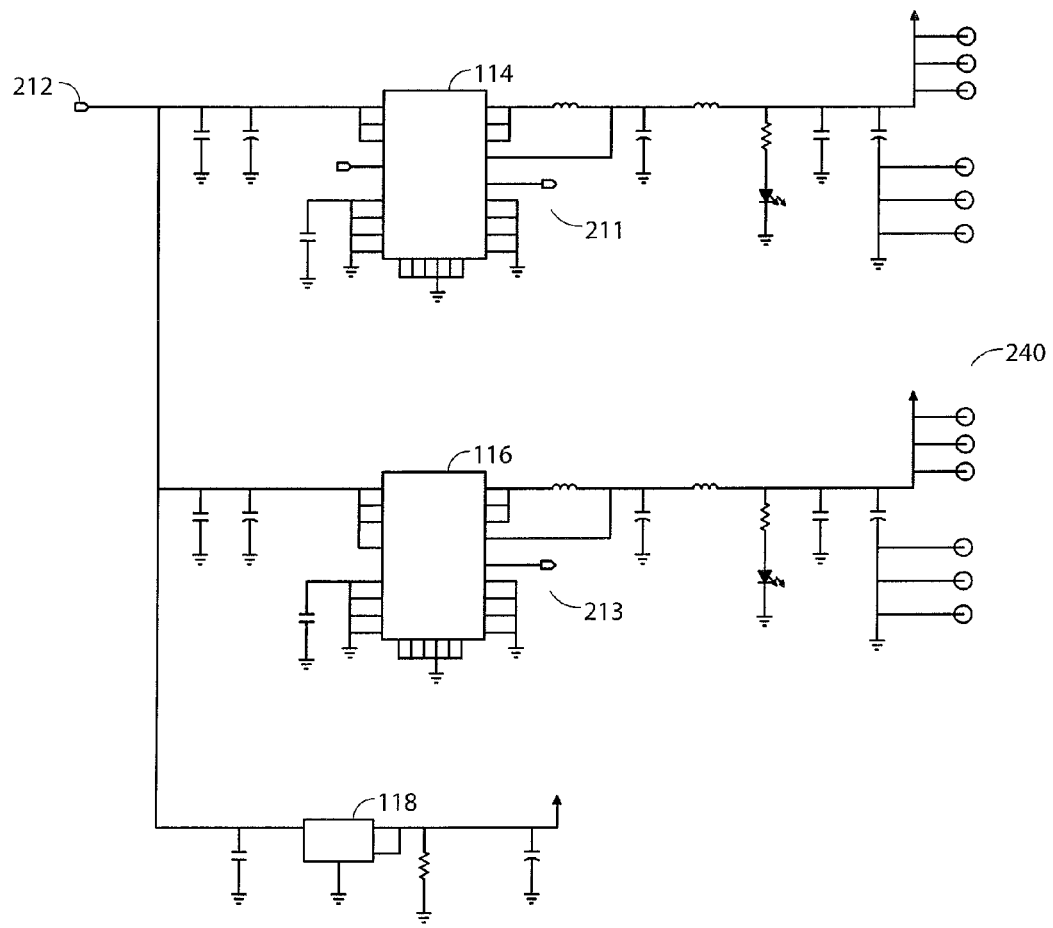
FIG. 26 depicts a diagram of a ??? of the electronic system of FIG. 7.

FIG. 26 shows an example diagram for powering tester (10) through system signal (212). As discussed above, system signal (212) is provided by either battery (40) or auxiliary power supply (38). This signal is transmitted through a series of voltage regulators (114, 116, 118). In the present embodiment, tester (10) may be configured to run on either 5 Volts or 3.3 Volts. Depending of the voltage selected, the appropriate power signal (211, 213) is transmitted to controller (50). Thermal holes (240) are also provided to dissipate heat from electronic system (13). Of course, other configurations to power tester (10) will be apparent to one with ordinary skill in the art in view of the teachings herein.

C. Transducers

Figure 27:
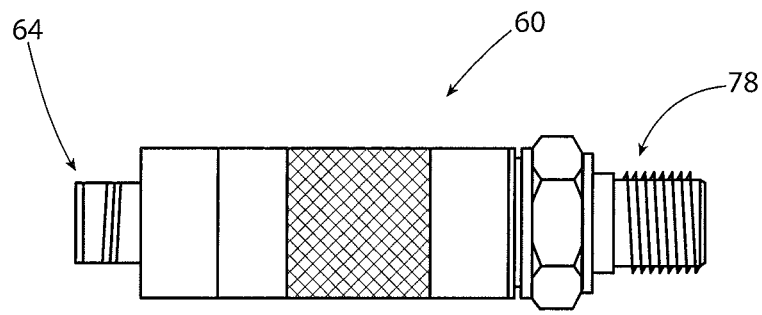
FIG. 27 depicts a front view of a transducer of the combination tester of FIG. 1.
Figure 28:
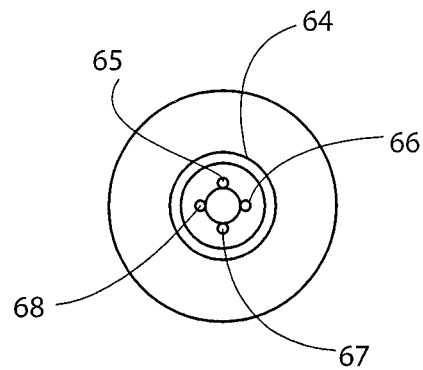
FIG. 28 depicts an end view of the transducer of FIG. 27.
Figure 29:
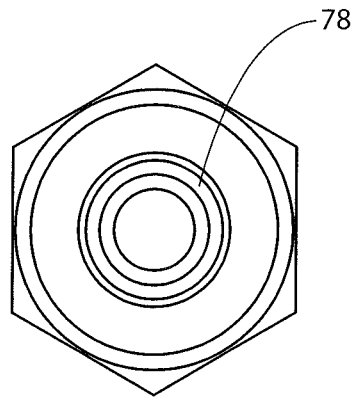
FIG. 29 depicts an end view of the transducer of FIG. 27.
Figure 30:
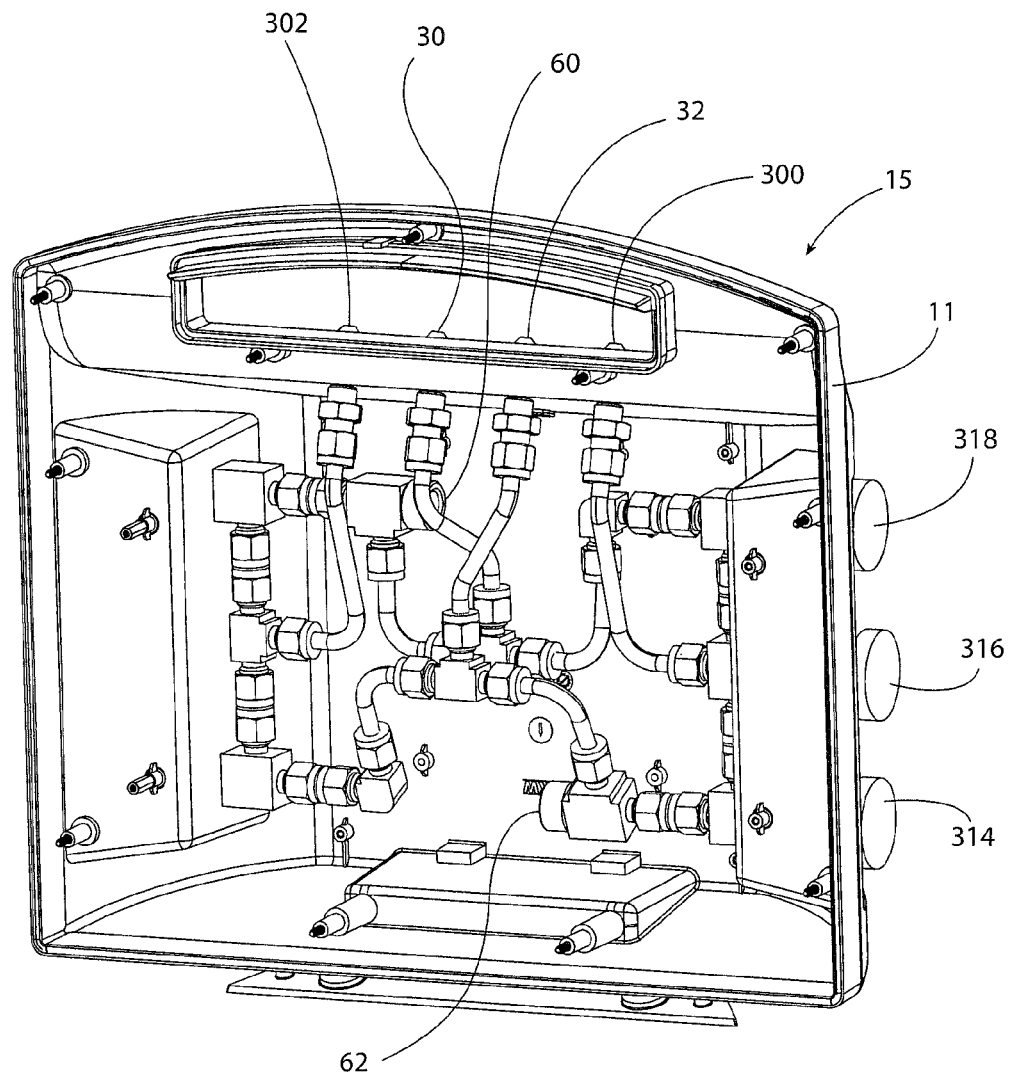
FIG. 30 depicts a cross-sectional view of the combination tester of FIG. 1, showing a valve assembly.
Figure 34:
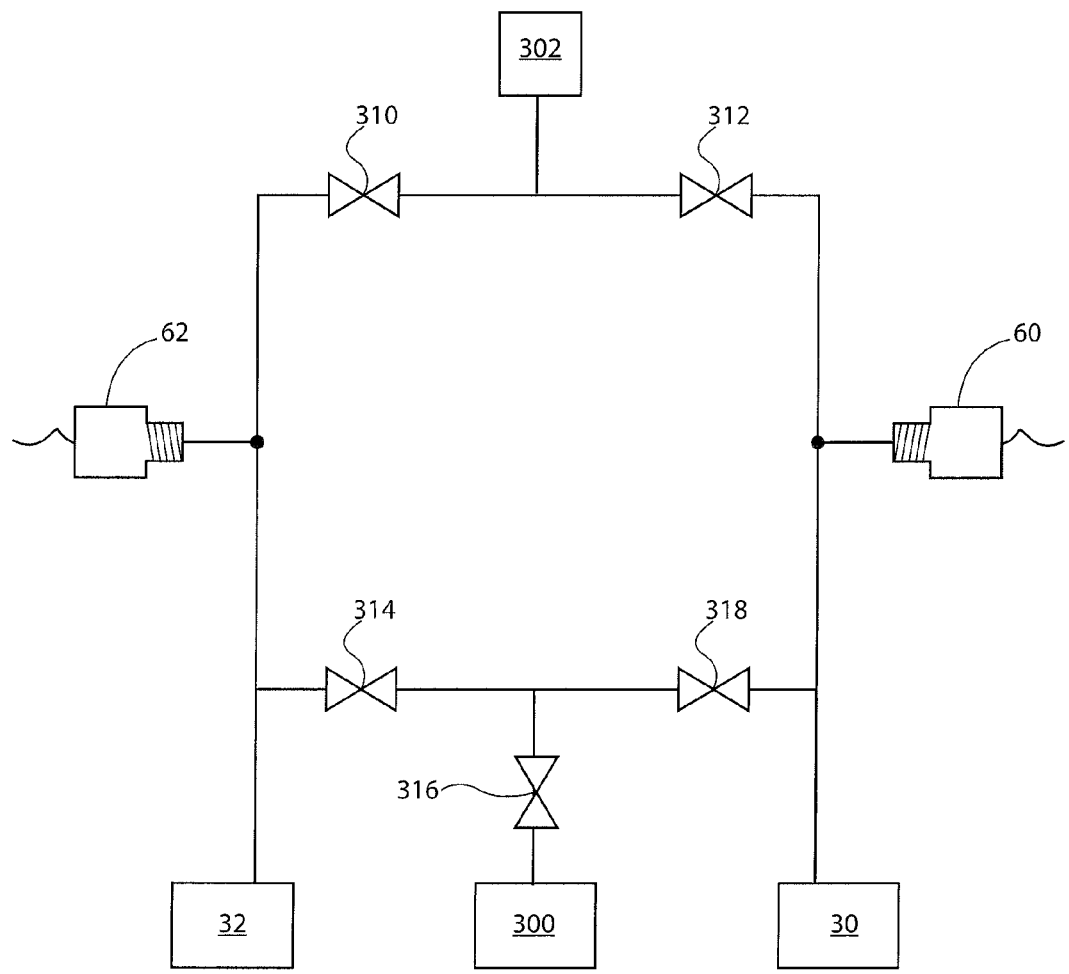
FIG. 34 depicts a schematic of the valve assembly of FIG. 30.

Transducer (60) is shown in FIGS. 27-29. Transducer (60) is operable to convert the pressure received from pressure input port (30) into an electrical signal, which is then transmitted to controller (50). Transducer (60) receives the pressure input through connection (78). In the present embodiment, connection (78) is about a ¼ inch stainless steel connection. Transducer (60) is configured to measure pressures between about 0 psi and about 200 psi. Transducer (60) then transmits the electrical signal through connection (64). Connection (64) comprises a four-pin connector (64), which as best seen in FIG. 28, includes a power supply pin (65), an output pin (68), a common pin (67), and a digital output pin (66). Transducer (60) is configured with an accuracy of about 0.2%. Transducer (62) is similar to transducer (60). Transducers (60, 62) can be a TD 1000 Series Transducer manufactured by Transducers Direct, located in Cincinnati, Ohio.

Although tester (10) is illustrated as comprising two transducers (60, 62), tester (10) can comprise any suitable number of transducers (60, 62). Transducers (60, 62) can be configured to measure the same amount of pressure, or transducers (60, 62) can be configured to measure different pressures. For instance, transducer (60) can be configured to measure low pressures, while transducer (62) is configured to measure high pressures. Transducers (60, 62) can be used simultaneously to measure two different pressure inputs, or transducers (60, 62) can be used individually to measure a single pressure with tester (10). Other suitable configurations for transducers (60, 62) will be apparent to one with ordinary skill in the art in view of the teachings herein.

D. Valve Assembly

FIGS. 30-34 show valve assembly (15) of combination tester (10). Valve assembly (15) comprises pressure inputs (30, 32), outlets (300, 302), valves (310, 312, 314, 316, 318), and transducers (60, 62). First input port (30), which may be configured to read low pressures, is fluidly coupled with first transducer (60). First valve (318) can be opened and/or closed to selectively supply the first input pressure with first transducer (60). The output flow from first transducer (60) is coupled to outlet vent (302). First vent valve (312) is positioned between first transducer (60) and outlet vent (302) such that first vent valve (312) can be opened and/or closed to selectively vent first transducer (60). Second input port (32), which may be configured to read high pressures, is fluidly coupled with second transducer (62). Second valve (314) can be opened and/or closed to selectively supply the second input pressure with second transducer (62). The output flow from second transducer (62) is coupled to outlet vent (302). Second vent valve (310) is positioned between second transducer (62) and outlet vent (302) such that second vent valve (310) can be opened and/or closed to selectively vent second transducer (62). Alternatively, one vent valve can be provided for both first transducer (60) and second transducer (62). A bypass outlet (300) also provided in valve assembly (15) and can be selectively opened and/or closed with bypass valve (316).

Valves (310, 312, 314, 316, 318) comprise integral bonnet needle valves having a connection size of about ¼ inch. In the present embodiment, valve assembly (15) can be configured to be used as either a 3 valve tester or a 5 valve tester. This allows tester (10) to confirm with various industry specified testing instructions for backflow testing. Valve assembly (15) is further configured to handle multiple mediums, such as water, air, natural gas, etc. Still other suitable configurations for valve assembly (15) will be apparent to one with ordinary skill in the art in view of the teachings herein.

II. Method for Operating a Combination Tester

Combination tester (10) is operable to conduct a plurality of plumbing tests, such as a backflow test, a gas leak test, and a manometer test, by reading pressures and calculating pressure differentials in a desired unit of measurement. After powering on combination tester (10), combination tester (10) runs a general start-up sequence (400) to calibrate tester (10). After start-up sequence (400), the user may select a test to perform with combination tester (10). During the test, combination tester (10) gathers test results and other desired information, such as a time and/or date stamp, GPS coordinates, tester information, company information, device information, etc. Combination tester (10) may transfer this information in real time as tester (10) gathers the data and/or store this information for transferring at a later time. For instance, combination tester (10) may transfer data through wireless technology (60) to a web-based database that can be viewed in real time as tester (10) gathers the data. Alternatively or in addition to, tester (10) can store the data in memory (52) and/or SD card input (36). Once testing is complete, combination tester (10) is able to transfer the data to other devices, such as a printer, a computer, and/or a cell phone, through wireless communications (80), Bluetooth communications (84), and/or USB port (34).

A. General Startup

Figure 36:
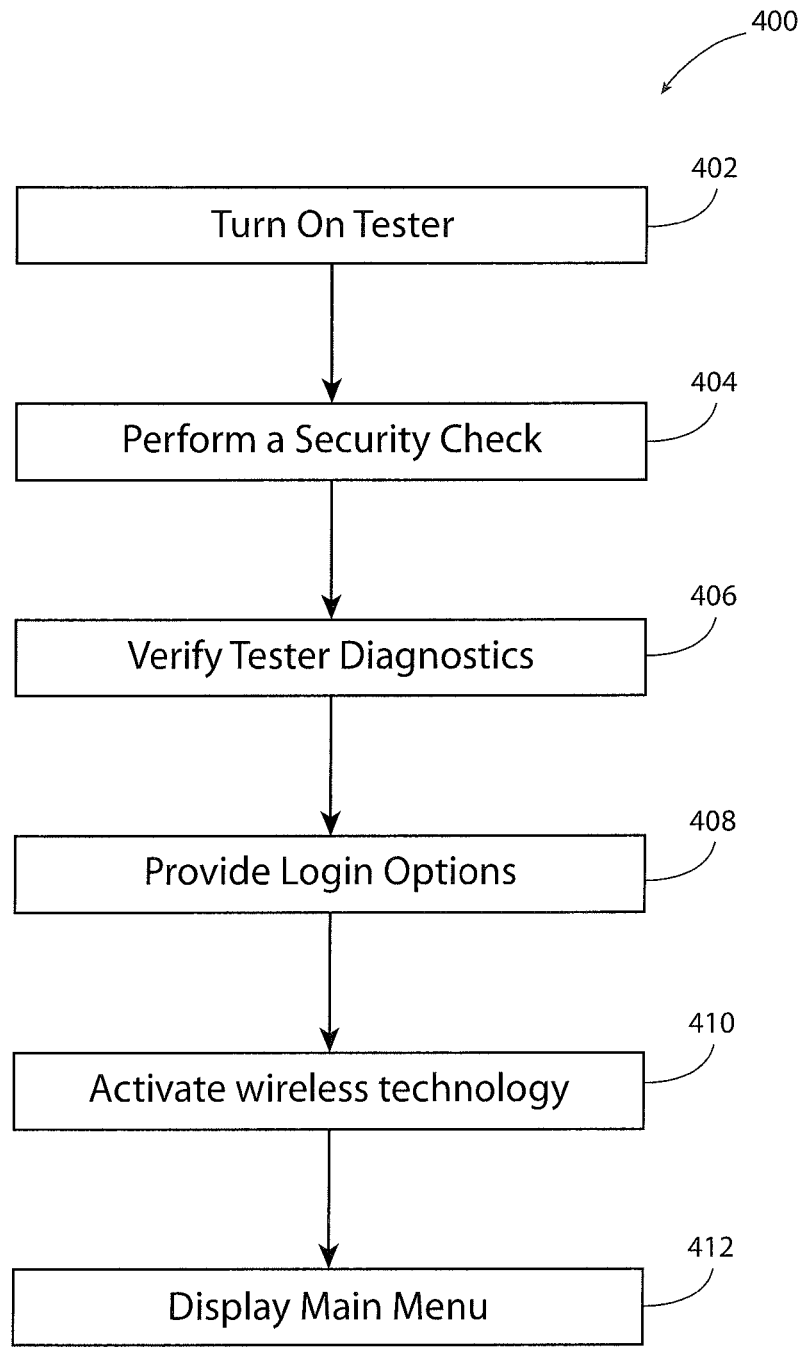
FIG. 36 depicts a flowchart of a general start-up for the combination tester of FIG. 1.

FIG. 36 shows an example start-up sequence (400) for tester (10). Start-up sequence (400) includes turning on tester (10) (block 402), performing a security check (block 404), verifying tester (10) diagnostics (block 406), providing login options (block 408), activating wireless technology (block 410), and displaying the main menu (block 412). Tester (10) may be powered on by pressing power button (not shown) to thereby activate battery (40) and/or auxiliary power (38) to supply power to tester (10). Once tester (10) is powered, tester (10) may perform a security check (block 404) by requesting the user to enter a tester password. The security check (block 404) is merely optional. Tester (10) may then verify tester (10) diagnostics (block 406). Such diagnostics include checking the voltage of tester (10) with battery signal (214 (FIG. 16) to verify that there is sufficient battery life for tester (10). If battery (40) has a life below a predetermined threshold, tester (10) may power off or display a warning that the life of battery (40) is low on screen (16). If the life of battery (40) is above a predetermined threshold, tester (10) may check the voltage of transducers (60, 62). If transducers (60, 62) have a voltage out of a predetermined threshold range, tester (10) may power off or display a warning on screen (16). If transducers (60, 62) have a voltage within the predetermined threshold range, tester (10) may calibrate transducers (60, 62) to set transducers (60, 62) to substantially zero. Tester (10) may then check calibration of tester (10) to verify that tester (10) has been calibrated within a suitable period of time. If tester (10) has failed to calibrate within the suitable period of time, tester (10) may display a warning on screen (16) that tester (10) may be inaccurate. If tester (10) has been calibrated within the suitable period of time, tester (10) may provide login options to the user (block 408).

Such login options include adding a new user for tester (10), logging in as a guest, and/or logging in as an existing user. If a new user is added, the user may input information, such as his name, company, address, phone number, email address, backflow certification number, plumber license, etc. Tester (10) may be able to store information for multiple users, such as up to ten users. If the user logs into tester (10) as a guest, tester (10) may prevent the user from recording data and/or storing test results. For an existing user, the user may input his username and/or password using keypad (18) on tester (10). Once tester (10) has verified the login information, tester (10) may activate wireless technology (block 410). This may include activating GPS communications (82), Bluetooth communications (84), and/or wireless communications (80). Tester (10) may then display main menu (500) on screen (16) (block 412).

B. Main Menu

Figure 37:
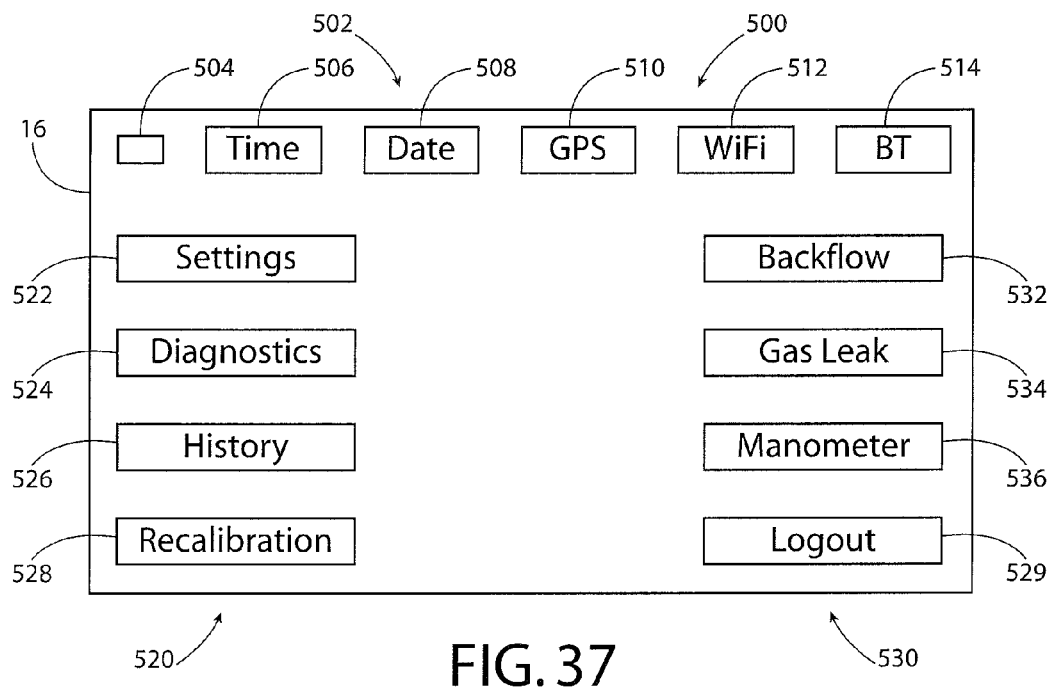
FIG. 37 depicts a schematic of a main menu display for the combination tester of FIG. 1.

FIG. 37 shows main menu (500) on screen (16) in more detail. Main menu (500) includes status icons (502), option icons (520), and test icons (530). Status icons (502) display status information for tester (10). In the present example, status icons (502) include battery icon (504), time icon (506), date icon (508), GPS icon (510), Wi-Fi icon (512), and Bluetooth icon (514). Battery icon (504) displays the status of battery life for tester (10), which may alert the user whether battery life is low, such as by blinking. Time icon (506) displays the current time. Date icon (508) displays the current date. GPS icon (510) displays whether GPS communications (82) are activated for tester (10). Wi-Fi icon (512) displays whether wireless communications (80) are activated for tester (10), such as whether tester (10) is connected to a wireless network and/or the signal strength of such network. Bluetooth icon (512) displays whether Bluetooth communications (84) are activated for tester (10) and/or whether tester (10) is connected with any other devices. Of course, other suitable status icon configurations may be used.

Figure 39:
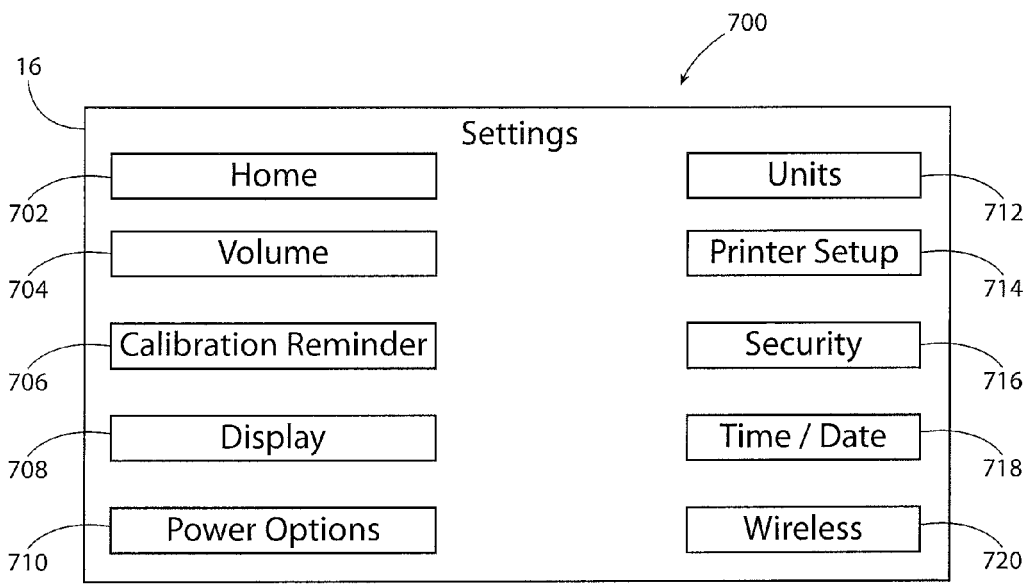
FIG. 39 depicts a schematic of a settings display for the combination tester of FIG. 1.

Option icons (520) of main menu (500) may be selected to adjust different options for tester (10). In the present example, option icons (520) include settings icon (522), diagnostics icon (524), history icon (526), recalibration icon (528), and logout icon (529). A user may select an option icon (520) by pressing the icon displayed on screen (16) and/or using keypad (18). If settings icon (522) is selected, tester (10) directs the user to settings menu (700) shown in FIG. 39. Settings menu (700) includes icons for the user to adjust settings for tester (10). For example, volume icon (704) allows the user to turn the volume of tester (10) on and off, as well as adjust the level of the volume of tester (10). Calibration icon (706) allows the user to set and/or adjust the number of days in advance the user receives a reminder to recalibrate tester (10). Display icon (508) allows the user to adjust settings on display (16), such as the backlight level, timeout, contrast settings, icon sizes, font sizes, and/or language of tester (10). Power Options icon (510) allows the user to set and/or adjust the inactivity timeout before tester (10) powers off after being inactive for that amount of time. Units icon (512) allows the user to change the units of tester (10) between metric and imperial. Printer setup icon (514) allows the user to add a printer or other external device in connection to tester (10). Security icon (516) allows the user to select whether tester (10) requires a password, or to change a password for tester (10) or a specific user. Time/date icon (518) allows a user to change the time or date stored in tester (10), which may be adjustable to different time zones. Wireless icon (520) allows a user to select wireless networks to connect with tester (10). Home icon (502) allows the user to return to main menu (500). Other setting configurations may be used. In some instances, calibration date, serial number, and other pieces of data that could undermine the integrity of the data captured by tester (10) may not able to be changed in the field.

Figure 40:
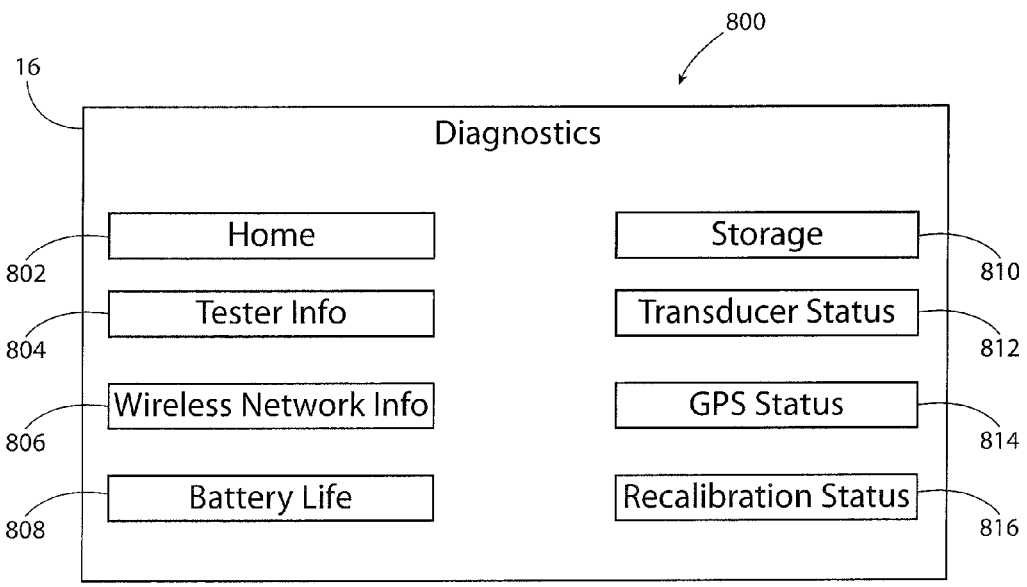
FIG. 40 depicts a diagnostics display for the combination tester of FIG. 1.

If diagnostics icon (524) is selected from main menu (500), tester (10) directs the user to diagnostics menu (800) shown in FIG. 40. Diagnostics menu (800) displays diagnostic information for tester (10). In the present example, diagnostics menu (800) includes a home icon (802), a tester info icon (804), a wireless network info icon (806), a battery life icon (808), a storage icon (810), a transducer status icon (812), a GPS status icon (814), and a recalibration status icon (816). Home icon (802) is similar to home icon (702) and allows the user to return to main menu (500). Tester info icon (804) may be selected to display information about tester (10). For instance, tester (10) may display information about the model number, serial number, software version, etc. of tester (10). Wireless network info icon (806) may be selected to view the wireless address and/or Bluetooth address for tester (10). Battery life icon (808) may be selected to view a more detailed status of the life remaining for battery (40). Storage icon (810) may be selected to display the amount of memory remaining for tester (10) in memory (52). GPS status icon (816) may be selected to view the current location of tester (10). Recalibration status icon (818) may be selected to view the last date that tester (10) was recalibrated and/or the remaining time before tester (10) needs to be recalibrated again. Other diagnostic configurations will be apparent to one with ordinary skill in the art in view of the teachings herein.

Figure 41:
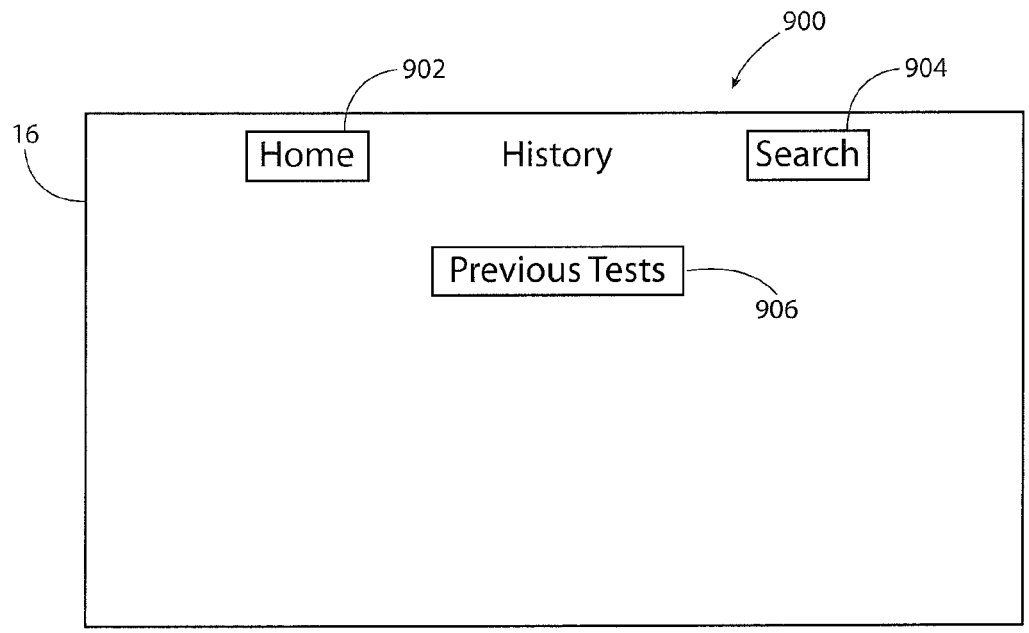
FIG. 41 depicts a history display for the combination tester of FIG. 1.

If history icon (526) is selected from main menu (500), tester (10) directs the user to history menu (900) shown in FIG. 41. History menu (900) provides a history of the tests performed by tester (10). In the present example, history menu (900) includes a home icon (902), a search icon (904), and a previous tests icon (906). Home icon (902) is similar to home icon (702) and allows the user to return to main menu (500). Previous tests icon (906) displays the previous tests performed by tester (10). The previous tests may be displayed in ascending order from the most recent test and may display the date, the address, the serial number, the type, and the status of the test that was performed with tester (10). The user may be enabled to select a test displayed by previous tests icon (906). The user may then choose to delete the test data from tester (10) and/or view the test data. If an incomplete test is selected, the user may choose to complete the test. If a complete test is selected, the user may choose to send the test results to a database or email through the wireless communications (80), and/or to send the test results to an external device via the Bluetooth communications (84) or USB port (34). Search icon (904) may be selected to allow the user to search the test data stored in tester (10). Of course, other history configurations may be used.

Figure 42:
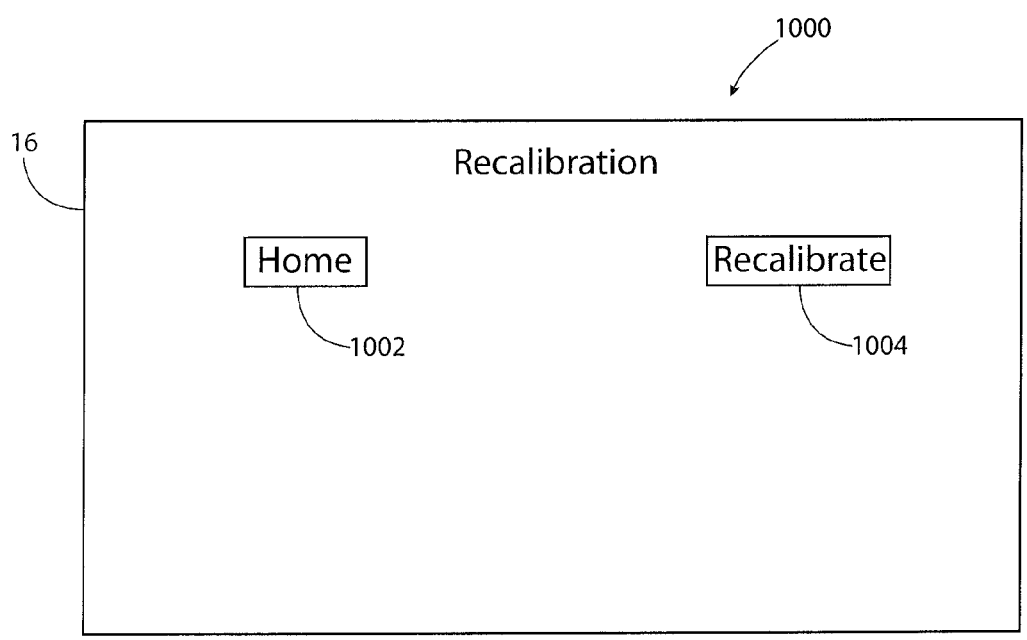
FIG. 42 depicts a recalibration display for the combination tester of FIG. 1.

If recalibration icon (528) is selected from main menu (500), tester (10) directs the user to recalibration menu (1000) shown in FIG. 42. Recalibration menu (1000) allows a user to recalibrate tester (10). In the present example, recalibration menu (1000) includes a home icon (1002) and a recalibrate icon (1004). Home icon (1002) is similar to home icon (702) and allows the user to return to main menu (500). If recalibrate icon (1004) is selected, control (50) recalibrates tester (10). To recalibrate tester (10), the user may be required to enter a code for security purposes. Tester (10) may be recalibrated by setting the pressure to substantially zero and setting tester (10) to substantially zero. Then the pressure may be set to about 130 psig and tester (10) may be set to about 130 psig. The user can then verify that the recalibration was performed properly. If recalibration was not performed properly, recalibration can be performed again. If was performed properly, the calibration date stored in tester (10) can be reset and the new calibration date can be transferred via wireless communications (80), Bluetooth communications (84) and/or USB port (34). Other recalibration configurations will be apparent to one with ordinary skill in the art in view of the teachings herein.

Figure 38:
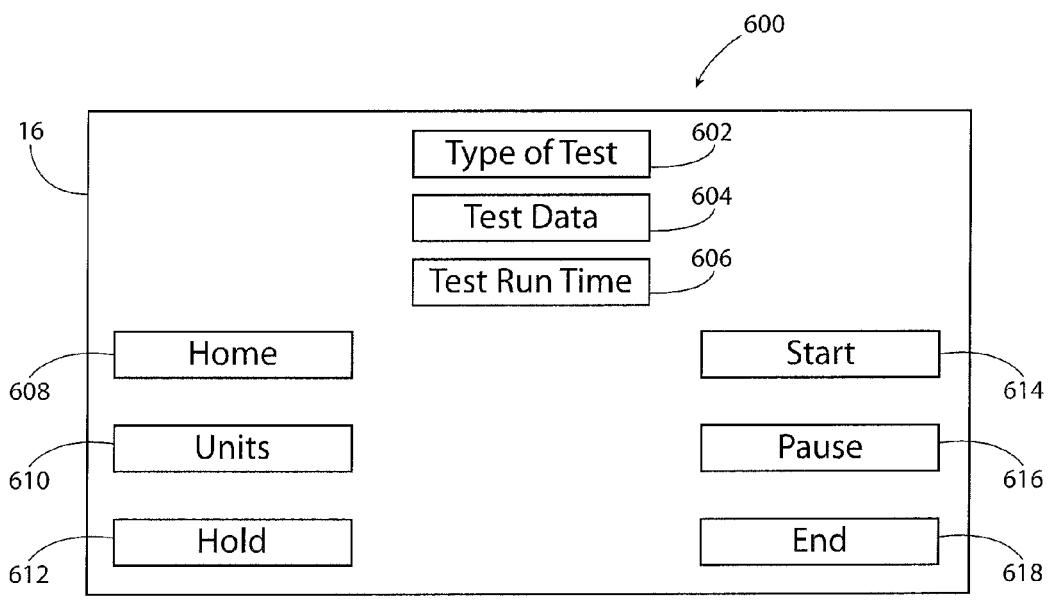
FIG. 38 depicts a schematic of a test display for the combination tester of FIG. 1.

Returning to FIG. 37, main menu includes a logout icon (529). If logout icon (529) is selected from main menu (500), tester (10) may logout and/or allow tester (10) to change users. Test icons (530) of main menu (500) may be selected to perform various tests with tester (10). If a test icon (530) is selected from main menu (500), tester (10) directs the user to test menu (600) shown in FIG. 38. Test menu (600) displays the type of test (e.g., backflow (232), gas leak (234), manometer (236), etc.) with type of test icon (602). Test data is displayed by test data icon (604), and test run time is displayed by test run time icon (606). Test menu (600) further includes home icon (608), units icon (610), hold icon (612), start icon (614), pause icon (616), and end icon (618). Home icon (608) is similar to home icon (702) and allows the user to return to main menu (500). Units icon (610) displays the type of units selected for tester (10), metric or imperial. Hold icon (712) may be used during a test to hold the device being tested, such as a relief valve, in a desired position during the test. Start icon (614) starts the type of test that was selected. Pause icon (616) allows the user to pause the test being performed. End icon (618) allows the user to end the test being performed. If end icon (618) is pressed, tester (10) labels the completed test with the brand, type, size, and/or location of the test, but other test configurations may be used. The test results and other test information may be transferred to other devices by wireless communications (80), Bluetooth communications (84) and/or USB port (34), which will be discussed in more detail below. This information may be tracked and allow the user and/or manufacturer of the device being tested to forecast potential failures for the device.

In some versions, tester (10) is able to be preprogrammed to allow for customized test procedures in the case that any water purveyor and/or gas utility company desires additional test procedures. This customization may allow tester (10) to prompt the user through display (16) of the test procedures to ensure accurate and secure results.

C. Backflow Test

Figure 43:
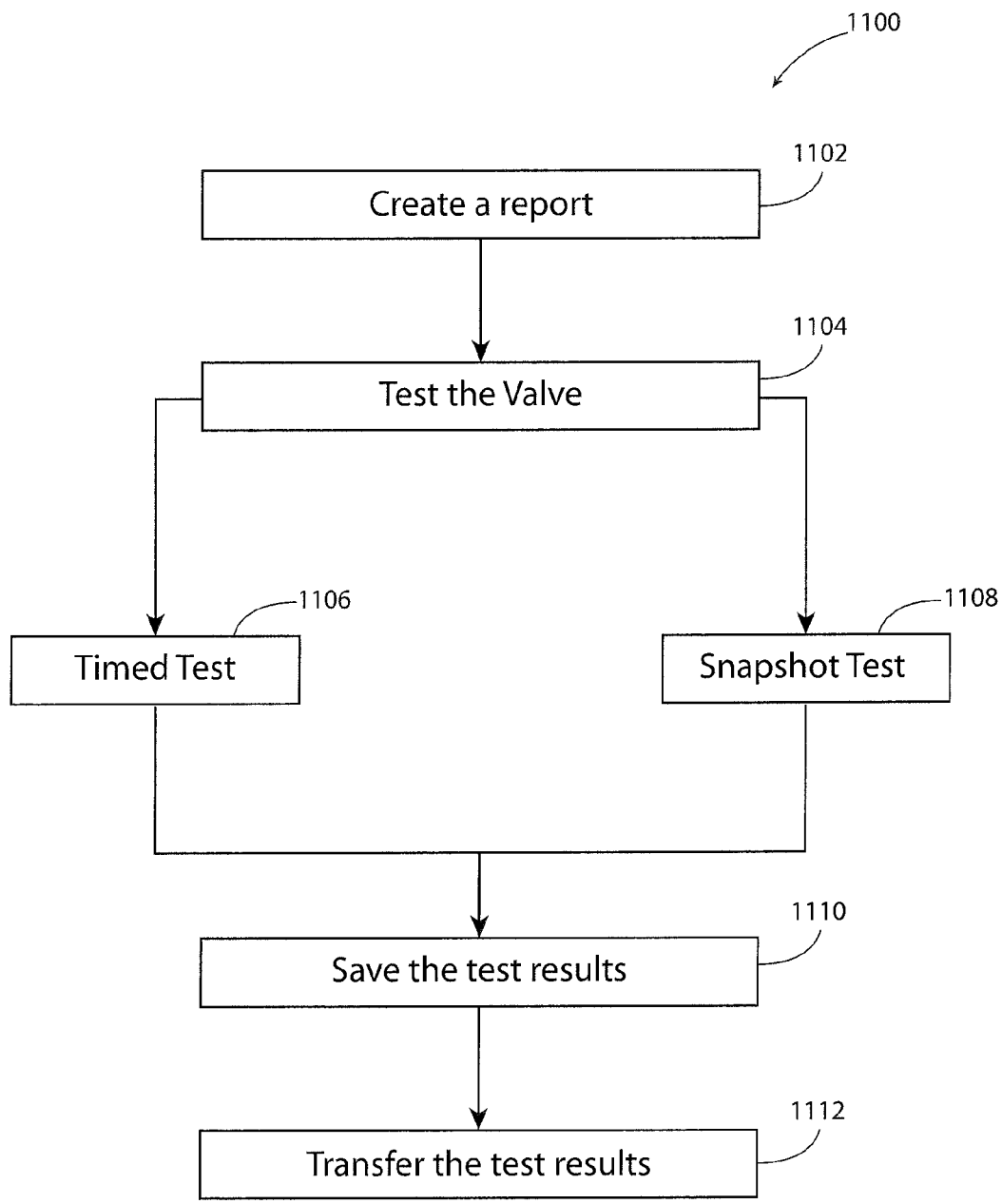
FIG. 43 depicts a flowchart of a backflow test for the combination tester of FIG. 1.

If a backflow test is selected from main menu (500) with backflow icon (532), a backflow test (1100) may be performed with tester (10) on a backflow prevention device, as depicted in FIG. 43. Such a backflow test (1100) of the present embodiment includes creating a report (block 1102), testing the valve (block 1104) with either a timed test (block 1106) and/or a snapshot test (1108), saving the test results (block 1110), and transferring the test results (block 1112). If a user chooses to create a report (block 1102), the user may be prompted by tester (10) to enter the serial number of the backflow prevention device to be tested. This information may be gathered from the device to be tested, or tester (10) may use wireless communications (80) to search a database for the serial number. If the serial number is found, tester (10) may locate and display previous test results and information for that device, such as the location of the device, the type of the device, and/or whether the test is being performed for a specific water purveyor or municipality. If the serial number is not found, tester (10) may prompt the user to enter such information about the device. Tester (10) may enable the user to edit information about the device with keypad (18). Such information may be saved by tester (10) in memory (52) and/or transferred to another device via wireless communications (80), Bluetooth communications (84), and/or USB port (34).

Once a report has been created, tester (10) may be used to perform the backflow test on a desired valve of a backflow prevention device (block 1104). For instance, pressure from upstream of the desired valve may be coupled to pressure input port (30) and pressure from downstream of the desired valve may be coupled to pressure input (32) to calculate a pressure differential with tester (10). GPS communications (82) may be activated to associate location data and/or time data with the test being performed. The user may select whether to perform a timed test (block 1106) or a snapshot test (block 1108). If a timed test is selected, the user may select start icon (614) from test menu (600) and tester (10) may set a timer for the test, such as for about 60 seconds. While the timed test is being performed, display (16) may display the results of the test by showing the readings of transducers (60, 62) for each pressure input port (30, 32), showing the pressure differential between each pressure input port (30, 32), and/or showing a countdown of the timer for the time remaining in the test. For instance, readings may be taken and displayed by tester (10) about every 2 seconds. Tester (10) may further indicate whether the readings taken by tester (10) are within a predetermined threshold, such as about 5 psi. If the pressure differential measured by tester (10) is outside of the threshold, display (16) may show those pressure differential readings in red. If the pressure differential measured by tester (10) is within the threshold, display (16) may show those pressure differential readings in green. Of course, other display configurations will be apparent to one with ordinary skill in the art in view of the teachings herein.

Once the timed test is complete, tester (10) may verify whether the desired valve of the backflow prevention device being tested successfully passed the test. For instance, tester (10) may evaluate whether a specific number of readings were within the predetermined threshold. If about 28 of the about 30 readings were within the predetermined threshold, tester (10) may report that the valve passed the backflow test. If the test results were not within the predetermined threshold, tester (10) may indicate that the device failed the backflow test and prompt the user to try the test again and/or to save the current test results.

If the user selects a snapshot test (block 1108), tester (10) may take a snapshot of the desired valve to be tested by taking about one reading of the pressures from pressure input ports (30, 32). If the pressure differential is within the predetermined threshold, tester (10) may indicate that the valve successfully passed the backflow test. If the test results were not within the predetermined threshold, tester (10) may indicate that the device failed the backflow test and prompt the user to try the test again and/or to save the current test results. Such tests may be repeated for each desired valve of the backflow prevention device. Of course, other backflow test configurations will be apparent to one of ordinary skill in the art in view of the teachings herein.

Tester (10) may then create a test report based on the test results taken from the backflow test. An example test report (1200) is shown in FIG. 44. Test report (1200) includes location data (1202) of the tested device, provided by GPS communications (82) within tester (10). In some versions, location data (1202) may be manually entered. Location data (1202) may further include a map (1204) displaying the location of the tested device. Test report (1200) additionally includes owner information (1206) and device information (1208) of the tested backflow prevention device. Such information may include the company, address, phone number, serial number, manufacturer, model number, and/or the date of the test. Test report (1200) may display the type of backflow test preformed (1210), the test results (1214) to indicate whether the tested device passed the backflow test, any repairs made to the tested device (1216), and/or any additional tests (1218) that were run after the repairs were made. Tester verification (1220) is provided on test report (1200) to include the tester's name, certification number, and/or phone number. Test report (1200) may be verified by the test with tester signature (1222) and/or the device owner's signature (1224). Of course, other test report configurations will be apparent to one with ordinary skill in the art in view of the teachings herein.

Test report (1200) and/or other test result information from the backflow test can then be transferred (block 1112). During the test, combination tester (10) may transfer the test information in real time as tester (10) gathers the data and/or store this information for transferring at a later time. For instance, combination tester (10) may transfer data through wireless communications (80) to a web-based database that can be viewed in real time as tester (10) gathers the data. Alternatively or in addition to, tester (10) can store the data in memory (52) and/or SD card input (36). Once testing is complete, combination tester (10) is able to transfer the data to other devices, such as a printer, a computer, and/or a cell phone, through wireless communications (80), Bluetooth communications (84), and/or USB port (34).

D. Gas Leak Test

Figure 45:
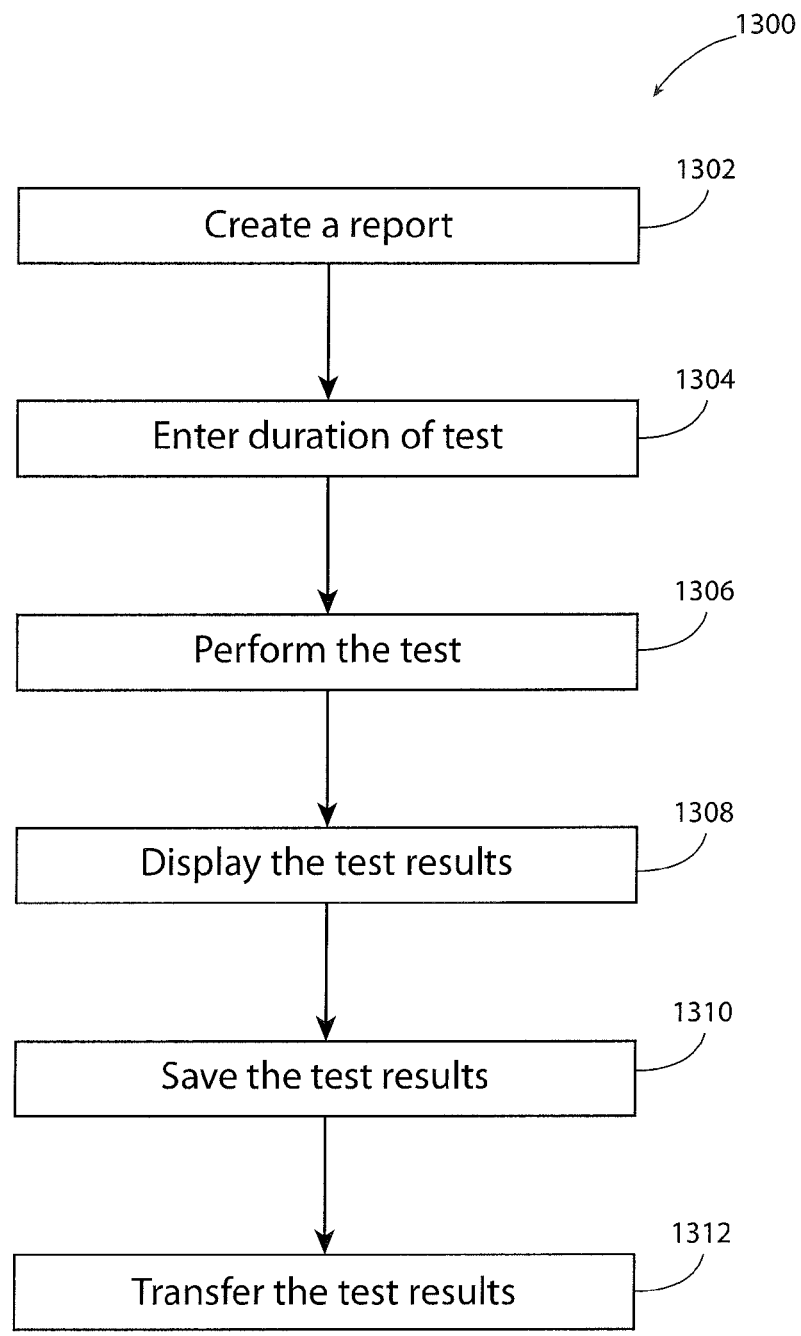
FIG. 45 depicts a flowchart of a gas leak test for the combination tester of FIG. 1.

Tester (10) is further operable to perform a gas leak test (1300), as depicted in FIG. 45. Gas leak test (1300) includes creating a report (block 1302), entering a duration of the test (block 1304), performing the test (block 1306), displaying the test results (block 1308), saving the test results (block 1310), and transferring the test results (block 1312). The method for creating a report for gas leak test (1300) is similar to creating a report for backflow test (1100). The pressure for the area desired to be tested for a gas leak is coupled with a select one of the pressure input ports (30, 32). GPS communications (82) is activated to associate location data and/or time data with the test being performed. The user may then enter a desired duration for the test (block 1304) and select start icon (614) to being the gas leak test. Gas leak test (1300) may be performed at variable time ranges. As tester (10) is measuring the pressure with the respective transducer (60, 62) for the selected pressure input port (30, 32), tester (10) may display the results on display (16). For instance, tester (10) may display the beginning pressure, the ending pressure, and/or the pressure drop experienced over the duration of the test. If the pressure drop is within a predetermined threshold, tester (10) may indicate that there is no gas leak, but if the pressure drop is outside of the predetermined threshold, tester (10) may indicate that there is a gas leak. Tester (10) may then save and/or transfer the test results and other test information similar to backflow test (1100).

E. Manometer

Figure 46:
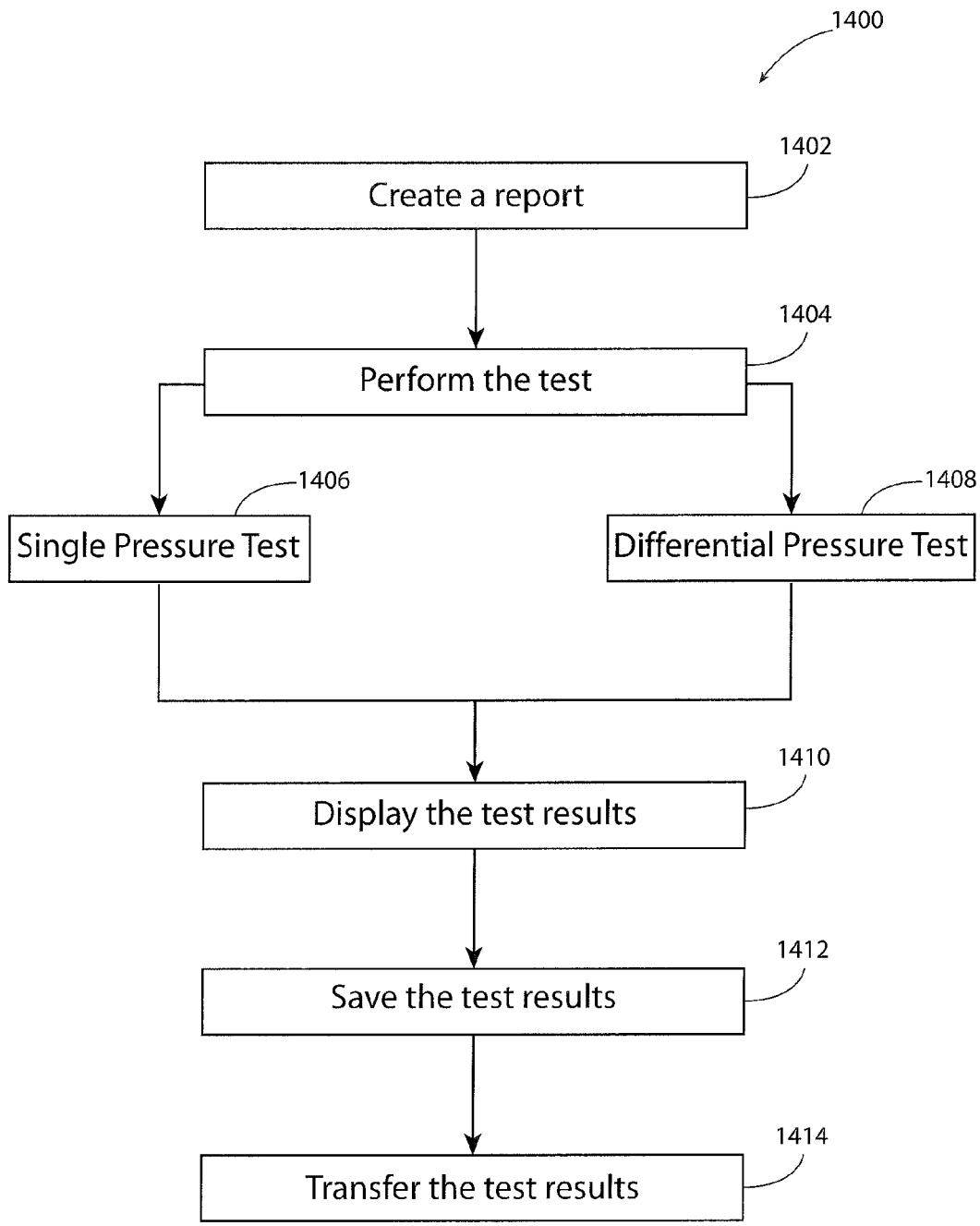
FIG. 46 depicts a flowchart of a manometer test for the combination tester of FIG. 1.

Tester (10) is further operable to be set as a manometer to perform other plumbing tests, as depicted in FIG. 46. Tester (10) is operable to measure pressures for a variety of media, including air, water, natural gas propane, or any other media requiring pressure reading of inches of water column. Tester (10) may be left at a testing site to track data over long periods of time. Manometer test (1400) includes creating a report (block 1402), performing a test (block 1404) by a single pressure test (block 1406) or by a differential pressure test (block 1408), displaying the test results (block 1410), saving the test results (block 1412), and transferring the test results (block 1414). The method for creating a report for manometer test (1300) is similar to creating a report for backflow test (1100). If a single pressure test is selected, the user couples a single pressure to a select one of pressure input ports (30, 32). If a differential pressure test is selected, a first pressure is coupled with pressure input port (30) and a second pressure is coupled with pressure input port (32). GPS communications (82) is activated to associate location data and/or time data with the test being performed. While tester (10) is performing manometer test (1400), tester (10) may display the single pressure readings, similar to gas leak test (1300), or the differential pressure readings, similar to backflow test (1100). Tester (10) may then save and/or transfer the test results and other test information similar to backflow test (1100).

It should be understood that any one or more of the teachings, expressions, embodiments, examples, etc. disclosed herein may be combined with any one or more of the other teachings, expressions, embodiments, examples, etc. that are disclosed herein. The teachings, expressions, embodiments, examples, etc. disclosed herein should therefore not be viewed in isolation relative to each other. Various suitable ways in which numerous aspects of the present disclosure may be combined will be readily apparent to those of ordinary skill in the art in view of the teachings disclosed herein. Such modifications and variations are intended to be included within the scope of both the present disclosure and the claims.

Having shown and described various embodiments of the present disclosure, further adaptations of the methods and systems described herein may be accomplished by appropriate modifications by one of ordinary skill in the art without departing from the scope of the present disclosure. Several of such potential modifications have been mentioned, and others will be apparent to those skilled in the art. For instance, examples, embodiments, geometrics, materials, dimensions, ratios, steps, and the like discussed above are illustrative and are not required. Accordingly, the scope of the present disclosure should be considered in terms of the following claims and is understood not to be limited to the details of structure and operation shown and described in the specification and drawings.

I claim:

1. A tester operable to measure pressure, wherein the tester comprises a housing containing:
   a first pressure input port and a second pressure input port;
   a first transducer coupled to the first pressure input port, wherein the first transducer is operable to measure a pressure of the first pressure input port, and a second transducer coupled to the second pressure input port, wherein the second transducer is operable to measure a pressure of the second pressure input port;
   a valve assembly comprising:
      a first valve coupled with the first pressure input port, wherein the first valve is positioned upstream of the first transducer,
      a first vent valve coupled with an outlet vent, wherein the first vent valve is positioned downstream of the first transducer,
      a second valve coupled with the second pressure input port, wherein the second valve is positioned upstream of the second transducer,
      a second vent valve coupled with the outlet vent, wherein the second vent valve is positioned downstream of the second transducer, and
      a bypass valve coupled with a bypass outlet, wherein the bypass valve is positioned downstream of the first valve and the second valve;
   GPS communications operable to determine location data of the tester; and
   a controller programmable with customized test procedures, wherein the customized test procedures comprise performing one or more tests with the tester by adjusting one or more valves of the valve assembly in a predetermined sequence,
   wherein the controller is coupled with each of the first transducer, the second transducer, and the GPS communications,
   wherein the controller is operable to calculate a pressure based on the pressure measurements of the first and second transducers and based on the customized test procedures,
   wherein the controller is operable to associate the location data of the GPS communications with the calculated pressure to create a test result.

2. The tester of claim 1 further comprising a memory operable to store the test result.

3. The tester of claim 1 further comprising a battery operable to provide power to the tester.

4. The tester of claim 1 further comprising an auxiliary power port operable to provide power to the tester from an external power source.

5. The tester of claim 1 further comprising an SD card input port configured to receive an SD card, wherein the SD card input port is operable to store the test result on the SD card.

6. The tester of claim 1 further comprising a USB port, wherein the USB port is operable to transfer the test result to an external device.

7. The tester of claim 1 further comprising wireless communications, wherein the wireless communications are operable to connect the tester with a wireless network.

8. The tester of claim 7, wherein the wireless communications are operable to transfer the test result to a web-based database.

9. The tester of claim 7, wherein the wireless communications are operable to transfer the test result to another device connected to a wireless network.

10. The tester of claim 1 further comprising Bluetooth communications operable to transfer the test result to another device with Bluetooth communications.

11. The tester of claim 10, wherein the Bluetooth communications are operable to transfer the test result to a printer.

12. The tester of claim 1 further comprising a display operable to depict the test result on the tester.

13. The tester of claim 1 further comprising a keypad configured to receive inputs from a user of the tester.

14. A tester operable to measure pressure, wherein the tester comprises:
   a first pressure input port and a second pressure input port;
   a first transducer coupled to the first pressure input port, wherein the first transducer is operable to measure a pressure of the first pressure input port, and a second transducer coupled to the second pressure input port, wherein the second transducer is operable to measure a pressure of the second pressure input port;
   a valve assembly comprising:
      a first valve coupled with the first pressure input port, wherein the first valve is positioned upstream of the first transducer,
      a second valve coupled with the second pressure input port, wherein the second valve is positioned upstream of the second transducer, and
      a bypass valve coupled with a bypass outlet, wherein the bypass valve is positioned downstream of the first valve and the second valve;
   a controller coupled with the first and second transducers, wherein the controller is operable to calculate pressure based on the pressure measurements of the first and second transducers to create a test result; and
   a communication module operable to automatically wirelessly transfer the test result to another device in real time while the tester is receiving the pressure measurements.

15. A method of operating a tester comprising a first pressure input port and a second pressure input port, a first transducer coupled to the first pressure input port and a second transducer coupled to the second pressure input port, a controller operable to calculate a pressure from one or both of the first and second transducers, and a valve assembly comprising a first valve coupled with the first pressure input port, a second valve coupled with the second pressure input port, and a bypass valve coupled with a bypass outlet between the first valve and the second valve, the method comprising the steps of:
   selecting a type of test to run with the tester from a plurality of test options displayed in a test menu;
   providing prompts to selectively adjust one or more valves of the valve assembly in a predetermined sequence to perform the selected test with the tester;
   associating location data with the test performed to form a test result; and
   wirelessly transferring the test result to another device.

16. The method of claim 15 further comprising gathering information about a user of the tester.

17. The method of claim 15 further comprising gathering information about the device being tested by the tester.

18. The method of claim 15 further comprising creating a test report based on the test result.

19. The method of claim 15 further comprising predicting a failure of the device being tested.

20. The method of claim 15 further comprising prompting a user with steps of the selected test being performed with the tester.

\* \* \* \* \*